US010365897B1

(12) United States Patent
Shakeri et al.

(10) Patent No.: US 10,365,897 B1
(45) Date of Patent: Jul. 30, 2019

(54) MODEL RING COMPONENT

(75) Inventors: Mojdeh Shakeri, Southborough, MA (US); Michael D. Tocci, Medway, MA (US); John E. Ciolfi, Wellesley, MA (US); Ebrahim Mehran Mestchian, Newton, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 962 days.

(21) Appl. No.: 13/478,344

(22) Filed: May 23, 2012

(51) Int. Cl.
*G06F 17/50* (2006.01)
*G06F 8/30* (2018.01)
*G06F 8/34* (2018.01)

(52) U.S. Cl.
CPC . *G06F 8/30* (2013.01); *G06F 8/34* (2013.01)

(58) Field of Classification Search
CPC .................................. G06F 8/30; G06F 8/34
USPC .......................................................... 703/13
See application file for complete search history.

(56) References Cited

U.S. PATENT DOCUMENTS

| 5,699,507 | A | 12/1997 | Goodnow, II et al. |
| 6,425,762 | B1 * | 7/2002 | Ernst ........................ G06F 9/465 434/29 |
| 7,124,406 | B2 | 10/2006 | Ryu |
| 7,275,237 | B1 | 9/2007 | Schneider et al. |
| 7,324,931 | B1 | 1/2008 | Warlock |
| 7,420,573 | B1 | 9/2008 | Aberg |
| 7,469,201 | B2 | 12/2008 | Kiffmeier et al. |
| 7,487,080 | B1 | 2/2009 | Tocci et al. |
| 7,502,031 | B1 | 3/2009 | Pike et al. |
| 7,681,151 | B2 | 3/2010 | Ciolfi et al. |
| 7,742,903 | B2 | 6/2010 | Ciolfi et al. |
| 7,756,686 | B2 | 7/2010 | Kiffmeier et al. |
| 7,774,172 | B1 | 8/2010 | Yunt et al. |
| 7,809,545 | B2 | 10/2010 | Ciolfi et al. |
| 7,970,594 | B2 | 6/2011 | Gaudette |

(Continued)

FOREIGN PATENT DOCUMENTS

| EP | 1662381 A1 | 5/2006 |
| JP | 3-80327 | 4/1991 |

(Continued)

OTHER PUBLICATIONS

"Simulink Design Verifier 2 User's Guide," 2011, The MathWorks Inc., 470 pages.*

(Continued)

*Primary Examiner* — Kamini S Shah
*Assistant Examiner* — Russ Guill
(74) *Attorney, Agent, or Firm* — Cesari and McKenna, LLP

(57) ABSTRACT

A system and method creates a plurality of different ring components for a referenced model included within a parent model. The ring components include values for one or more model-level, block-level, and signal-level attributes of the referenced model. One or more ring components are selected and assigned to the referenced model in the context of the parent model. During execution of the parent model, information from the selected ring component is accessed and used to control execution of the referenced model. During code generation for the parent model, information from the selected ring component is accessed and used to control the code generation process for the referenced model.

32 Claims, 13 Drawing Sheets

(56) References Cited

U.S. PATENT DOCUMENTS

| | | | |
|---|---|---|---|
| 7,991,598 | B1 | 8/2011 | Wood |
| 8,046,751 | B1 | 10/2011 | Avadhanula et al. |
| 8,201,140 | B2 | 6/2012 | Raghavan et al. |
| 8,869,102 | B2 | 10/2014 | Avadhanula |
| 2002/0083413 | A1 | 6/2002 | Kodosky et al. |
| 2004/0153992 | A1 | 8/2004 | Molina-Moreno et al. |
| 2006/0190105 | A1 | 8/2006 | Hsu |
| 2007/0074184 | A1 | 3/2007 | Raghavan |
| 2007/0106489 | A1* | 5/2007 | Eryilmaz .......................... 703/22 |
| 2008/0263512 | A1 | 10/2008 | Dellas et al. |
| 2010/0198574 | A1* | 8/2010 | Veller .................. G06F 17/5022 703/14 |
| 2011/0137634 | A1 | 6/2011 | Avadhanula et al. |
| 2013/0282358 | A1* | 10/2013 | Clark .................. G06F 17/5022 703/22 |

FOREIGN PATENT DOCUMENTS

| | | |
|---|---|---|
| JP | 7-219759 | 8/1995 |
| JP | 8-241193 | 9/1996 |
| JP | 8-263299 | 10/1996 |
| JP | 11-85824 | 3/1999 |
| JP | 2001-125793 | 5/2001 |
| JP | 2004-502234 | 1/2004 |
| JP | 2005-122452 | 5/2005 |
| JP | 2006-92161 | 4/2006 |
| JP | 2006-351023 | 12/2006 |
| WO | WO 07/027622 A2 | 3/2007 |

OTHER PUBLICATIONS

"Real-Time Workshop Embedded Coder," 2004, The MathWorks Inc, 155 pages.*

"Embedded Systems and System on Chip," 2007, Xilinx, 104 pages.*

W. Cesario et al., "Component-based design approach for multicore Socs," 2002, Proceedings of the 39th Design Automation Conference, pp. 789-794.*

International Search Report and Written Opinion for Application No. PCT/US2010/059716, dated Mar. 31, 2011.

Nejati, Shiva et al., "Matching and Merging of Statecharts Specifications", 29th International Conference on Software Engineering (ICSE'07), May 2007, pp. 54-64.

Sane, Aamod et al., "Object-Oriented State Machines: Subclassing, Composition, Delegation, and Genericity," ACM Sigplan Notices, vol. 30(10): 17-32, Oct. 1995.

Toyoda, Masashi, et al., "Supporting Design Patterns in a Visual Parallel Data-flow Programming Environment," IEEE, Sep. 1997, p. 76-83.

Written Opinion for Application No. PCT/US2010/059716, dated Feb. 23, 2012.

"Model Reference Variants," The MathWorks, Inc., 2009, pp. 1-4.

"Component-Based Modeling with Model Reference," The Math Works, Inc., 2010, pp. 1-4.

"A Model Checking Example: Solving Sudoku Using Simulink Design Verifier," Lockheed Martin Corporation, 2009, pp. 1-7.

"Simulink Verification and Validation 3.0," The MathWorks, Inc., 2010, pp. 1-9.

"Simulink® 7: User's Gide," The MathWorks, Inc., Apr. 2011, pp. i-lviii, 1-1 to 1-46, 2-1 to 2-78, 3-1 to 3-138, 4-1 to 4-32, 5-1 to 5-84, 6-1 to 6-30, 7-1 to 7-38, 8-1 to 8-122, 9-1 to 9-34, 10-1 to 10-18, 11-1 to 11-46, 12-1 to 12-18, 13-1 to 13-82, 14-1 to 15-1 to 15-10, 16-1 to 16-44, 17-1 to 17-36, 18-1 to 18-56, 19-1 to 19-22, 20-1 to 20-80, 21-1 to 21-60, 22-1 to 22-46, 23-1 to 23-26, 24-1 to 24-234, 25-1 to 21-70, 26-1 to 26-26, 27-1 to 27-88, 28-1 to 28-44. 29-1 to 29-98, 30-1 to 30-96, 31-1 to 31-28, 32-1 to 32-26, 33-1 to 33-32, A-1 to A-4, Index-1 to Index-22.

Popinchalk, Seth, "The Answer for Large Scale Modeling: Model Reference," Guy and Seth on Simulink, The MathWorks, Inc., <http://blogs.mathworks.com/seth/2008/12/05/the-answer-for-large-scale-modeling-model-reference/>, Dec. 5, 2008, pp. 1-4.

Elrad, Tzilla, et al, "Discussion Aspects of AOP," Communications of the ACM, vol. 44, No. 10, Oct. 2001, pp. 33-38.

Fowler, Martin, "Lambda," Martin Fowler, <http://martinfowler.com/bliki/Lambda.html>, Sep. 8, 2004, pp. 1-4.

Gafter, Neal, "Neal Gafter's Blog: A Definition of Closures," <http://gafter.blogspot.com/2007/01/definition-of-closures.html >, Jan. 28. 2007, pp. 1-18.

"Libraries in Simulink," Guy and Seth on Simulink, The MathWorks, Inc., <http://blogs.mathworks.com/seth/2008/07/18/libraries-in-simulink/>, Jul. 18, 2008. pp. 1-11.

Pollice, Gary, "A Look at Aspect-Oriented Programming," IBM Corporation, <http://www.ibm.com/developerworks/rational/library/2782.html >, Feb. 17, 2004, pp. 1-7.

"Simulink User's Guide: R2012a," The MathWorks, Inc., Mar. 2012, pp. 1-2326.

Aarsenovski, Daniel, "Professional refactoring in Visual Basic," 2008, Wiley Publishing, Inc., pp. 229-235.

Banci, Michele, et al., "Statecharts composition to model topologically distributed applications," 2006, Journal of Integrated Design and Process Science, vol. 10, No. 1, pp. 1-15.

Bogdanov, Kirill et al., "Computing the structural difference between state-based models," 2009, 16th Working Conference on Reverse Engineering, pp. 177-186.

Ducasse, Stephane et al., "A language independent approach for detecting duplicated code," 1999, IEEE International Conference on Software Maintenance, ten pages.

European Office Action for Application No. 10798416.3,7 pages, dated Apr. 23, 2013.

Fleurey, Franck, et al., "A generic approach far automatic model composition," 2008, MoDELS 2007 Workshops, Springer-Verlag, pp. 7-15.

Fowler, Martin, "Refactoring Improving the Design of Existing Code," 1999, Addison-Wesley, pp. 283-284.

Gomaa, Hassan, "Designing Software Prtoduct Lines with UML," 2005, Addison-Wesley, pp. 117-135.

Japanese Office Action for Application No. 2012-543283, 10 pages, dated Oct. 8, 2013.

Jiang, Lingxiao et al., "DECKARD: Scalable and accurate tree-based detection of code clones," 2007, Proceedings of the 29th international conference on Software Engineering, ten pages.

Kelter , Udo et al. "Comparing state machines," 2008, Comparison and Versioning of Models 2008, pp. 1-6.

Kishi, Mihoko et at, "A program synthesis system based on state transition model," Research Report, The Information Processing SOCiety of Japan, vol. 91(66):167-174 (1991).

Leupers, Rainer, et al., "Function inlining under code size constraints for embedded processors," 1999, IEEE International Conference on Computer-Aided Design, pp. 253-256.

Oliveira, Kleinner S.F. et al., "A guidance for model composition," 2007, International Conference on Software Engineering Advances, six pages.

Pham, N.H. et al., "Complete and accurate clone detection in graph-based models," May 2009, IEEE 31st International Conference on Software Engineering, pp. 276-286.

Reddy, Raghu et al., "Model composition—a signature-based approach," 2005, Aspect Oriented Moeling Workshop at MODELS 20005, seven pages.

"Stateflow and Stateflow Coder," Version 5, 2003, The Math Works, 896 pages.

Vijaykumar, N.L., et al., "Handling with parameterized states in Statecharts for determining performance measurements of reactive systems," 2001, Proceedings of the VII International Conference on Industrial Engineering and Operations Management, 13 pages.

"Simulink®: User's Guide," R2011b, The MathWorks, Inc., Sep. 2011, pp. 1-2116.

"Simulink® Verification and Vaildation™: User's Guide," R2011b, The MathWorks, Inc., Sep. 2011, pp. 1-620.

* cited by examiner

MODEL RING COMPONENT

BRIEF DESCRIPTION OF THE DRAWINGS

The invention description below refers to the accompanying drawings, of which.

DETAILED DESCRIPTION OF ILLUSTRATIVE EMBODIMENTS

Background

Figure 1:
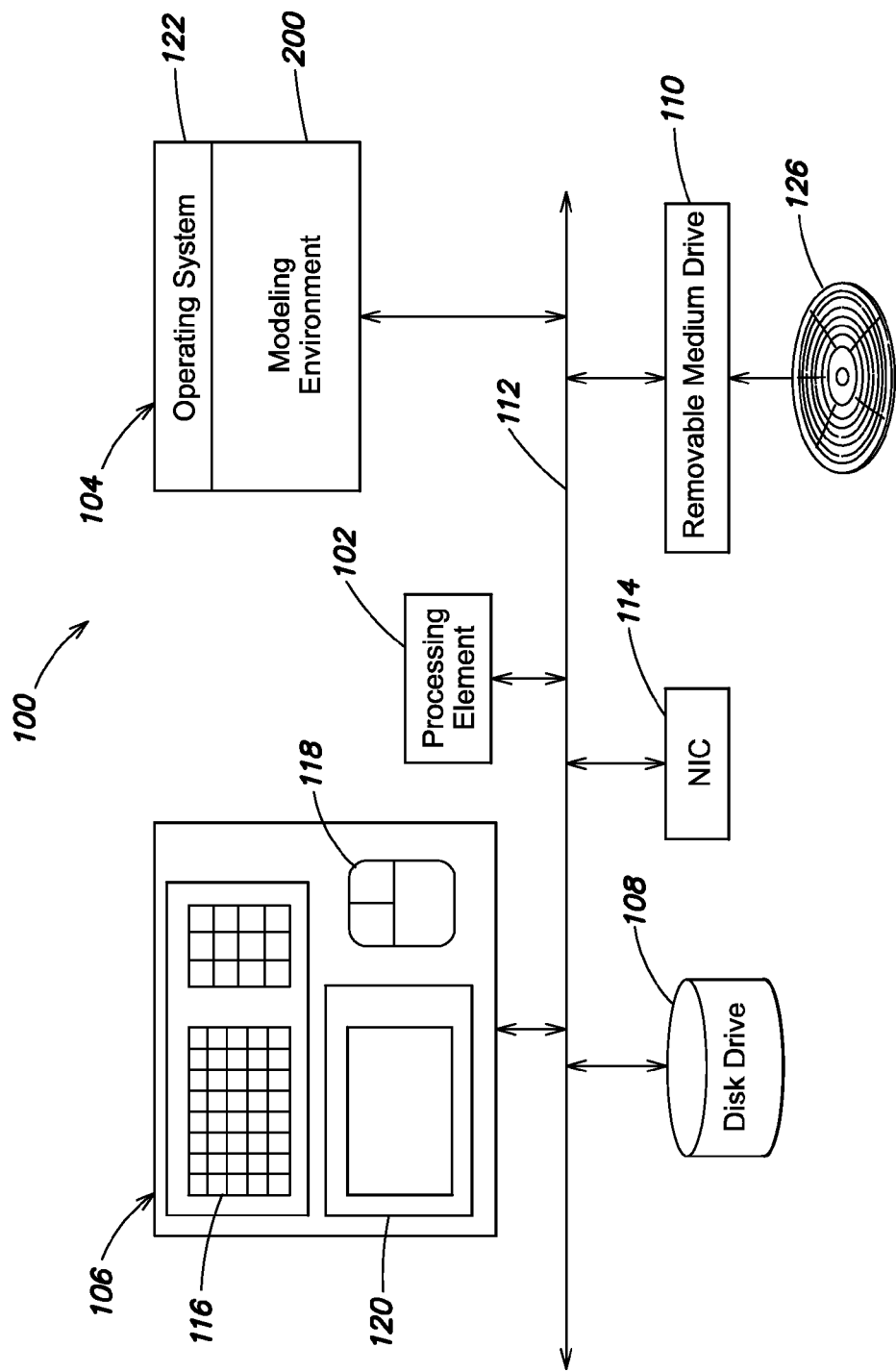
FIG. 1 is a schematic block diagram of a data processing system suitable for use with the present invention.

Engineers, programmers and others use graphical models to design and evaluate dynamic and other systems. A dynamic system is one that changes its state, for example over time. A graphical model may include a plurality of icons or blocks, at least some of which may represent functions or operations. The blocks may be interconnected by lines, such as arrows, that represent mathematical or other relationships among the blocks, such as signals utilized by the blocks. The graphical model may be constructed using a model-based design system, which may include a simulation engine for executing the model. During execution, the graphical model may receive input data, process that data, and generate results. The model-based design system may also include a code generator for generating code from the model. The generated code may be compiled and executed by a host or target computer or a data processing system. Alternatively or additionally, the model-based design system may include a static analyzer for static analysis of the model, which may be combined with additional properties, assertions, assumptions, and/or guarantees. During static analysis, the graphical model may be analyzed by methods that require only partial or no execution of the model, for example by interpreting classes of behaviors, abstract interpretation, model checking, range analysis, etc.

In addition to being specified graphically, such as through a graphical block diagram, a model may be defined textually, or a combination of graphically and textually.

As a given model becomes more complex, a user may choose to represent a set of blocks by a single block within the model. This single block may be referred to as a subsystem block. Subsystem blocks may contain other subsystem blocks, thereby establishing hierarchical levels within the model. Once created by the user, a subsystem block may be saved in a library of the model-based design system for re-use in other graphical models.

A graphical model may also include one or more partitions. For example, a first model, referred to as a parent model, may contain one or more other models, referred to as referenced models or sub-models. A referenced model is a stand-alone graphical model that is incorporated into the parent model. A referenced model may be executed itself, receiving input data, processing that data, and generating results. To reduce complexity, the referenced model may be represented graphically by a single block, called a model reference block, within the parent model. A referenced model may itself include one or more other referenced models.

While subsystem and model reference blocks improve the readability of complex graphical models, and facilitate model design, they typically have different characteristics. For example, a subsystem block may be context dependent. Accordingly, at least some of the subsystem's attributes may be left undefined. For example, data types, data dimensions, sample times, etc. of at least some of the blocks of a subsystem may be left undefined. Particular values for these attributes may be inherited from the graphical model into which the subsystem is added. In addition, the blocks of a subsystem may not execute atomically relative to the model in which it is located. Instead, execution of the blocks of a subsystem may be interleaved with the execution of other blocks of the model in which the subsystem is located. Block execution order may be determined by the simulation engine. Because it has undefined attributes and may not execute atomically, code may not be generated directly from a subsystem block. Instead, code corresponding to the functionality represented by the subsystem block may only be generated when code is generated for the model that contains the subsystem block.

In contrast, a referenced model may have well-defined attributes, such as data types, data dimensions, solver, sample times, etc. A referenced model may also execute atomically within the parent model. In addition, because it may execute atomically and have well-defined attributes, code may be generated directly from a referenced model. However, if a referenced model is inserted into a parent model, and a conflict exists between the pre-defined attributes of the referenced model and the attributes of that portion of the parent model to which the referenced model interfaces, the parent model may not execute, and instead may issue an error. Alternatively, the conflict may be automatically resolved using a default procedure, and a warning may be issued.

A model reference block, unlike a subsystem block, may also support incremental loading and incremental code generation. Incremental loading refers to a feature of the model-based design system in which a referenced model included in a parent model is not loaded into memory until the referenced model is actually needed by the parent model during execution or code generation of the parent model. In contrast, when a model having a plurality of subsystem blocks is executed, all of the subsystem blocks are loaded into memory during initialization, whether or not those subsystems are ever needed by the model during execution or code generation of the model. Incremental code generation may apply when code is generated for a parent model having a referenced model. If the referenced model is unchanged from a prior code generation operation, this previously generated code may be included in the code generated for the parent model, instead of re-generating code for the unchanged referenced model. Also, the code for a referenced model may only be generated when it is necessary. So, if a referenced model is conditionally executed by a parent model that is referencing it, and the condition never becomes true, code for the referenced model may not be generated. In contrast, every time code is generated for a model having a subsystem, new code corresponding to the subsystem is generated, even if the subsystem remains unchanged from a prior version of the model for which code was previously generated.

Overview

The present invention relates to a system and method for creating a plurality of different ring components for a model that may be referenced in a parent model. The parent model and the referenced model may be created in a modeling environment. A particular one of the ring components may be selected for use with the referenced model as included in the parent model. The selected ring component may be applied during execution, static analysis, or code generation of the parent model containing the referenced model. Each ring component may specify different characteristics or attributes for the referenced model. For example, each ring component may specify one or more model-level attributes or settings, such as model initial states, solver type, sample times, etc. In addition, each ring component may specify one or more block-level attributes or parameters, such as constant or coefficient value of a block within the referenced model. A ring component may also specify one or more signal-level attributes, such as a data type and data dimension of the referenced model's inputs and/or outputs. Thus, each ring component, when used with the referenced model, may result in a different execution, static analysis result, or code generation mode or behavior of the referenced model.

The ring components defined for a referenced model may be stored in a data structure, such as a configuration file, associated with the referenced model. A user may select one of the pre-defined ring components when the referenced model is added to a parent model, e.g., through a model reference block. For example, the user may select the ring component that is compatible with the portion of the parent model that connects to the referenced model and has a desirable execution or code generation behavior. In this way, incompatibilities that might otherwise exist between the parent and referenced models may be avoided through the use of the selected ring component. In addition, the same sub-model may be used with different parent models, yet the execution, static analysis, or code generation mode or behavior of the referenced model may be different by pairing the referenced model with a different ring component in the parent models.

In an embodiment, a ring component may be implemented through one or more interface objects that apply to inputs and outputs of a referenced model. Interface objects may be instantiated from one or more classes. Interface objects may contain information, for example property values, specifying particular block and signal level attributes for the referenced model as well as information concerning states, bus structures, and global data stores for the referenced model. Interface objects also may contain information specifying model-level attributes for the referenced model. A user may specify the values of properties of an interface object through a user interface, and an object constructor may instantiate an interface object whose properties have the specified values. A particular interface object may be selected for use with a referenced model, when the referenced model is included in a parent model. The selected interface object utilizes the information contained in the object to set block-level attributes, such as inputs and outputs of the referenced model, signal-level attributes, and model-level attributes.

In another embodiment, a ring component may be implemented through one or more configuration set objects that apply to model-level attributes of a referenced model. Configuration set objects may be instantiated from one or more classes. Configuration set objects may contain information specifying one or more model-level attributes for the referenced model, such as the selection of a solver, data import or export settings, optimizations, hardware implementations, etc. A user may specify the values of properties of a configuration set object through a user interface, and an object constructor may instantiate a configuration set object whose properties have the specified values. A particular configuration set object may be selected for use with a referenced model, when the referenced model is included in a parent model. The selected configuration set object utilizes the information contained in the object to set one or more model-level attributes of the referenced model.

In yet another embodiment, a ring component may be implemented through one or more parameter groups. Parameter groups may include information specifying block and signal level attributes for the referenced model. Parameter groups also may include information that applies to model-level attributes of the referenced model. A parameter group, which may be implemented as a container, may include an interface object and/or a configuration set object. Information contained in a selected parameter group may be applied to block parameters to configure block behaviors, to signal parameters to configure signals, and to model-level attributes.

In yet a further embodiment, a ring component may be implemented as a harness for the referenced model. For example, a user may graphically construct a harness model for the referenced model. The harness model may be constructed in a model editor. A library may provide one or more blocks for use in constructing the harness model. Blocks of a harness model may be graphically connected to, and may specify block and signal level attributes for the referenced model. In addition, a configuration set of a harness model may specify model-level attributes for the referenced model. For example, a first block may define a data type and data dimension for a first root-level input of the referenced model. A second block may define the data type and data dimension for a second root-level input of the referenced model. Harness models may be saved in the same file as the referenced model, or saved separately from the referenced model. A harness model may have a workspace, and a parameter group may be saved in the workspace of a harness model, and used in combination with the harness.

A ring component development system may include a ring component constructor, a component store, and a selector. The ring component constructor may create one or more ring components. The ring components may be stored in the component store, and may be associated with the referenced model. The selector may choose a particular ring component for the referenced model, for example when it is added to a parent model. The selector may be user operated or programmatically operated.

A code generator of a model-based design environment may generate code automatically for a referenced model and a selected ring component. Furthermore, a referenced model and a selected ring component may support features such as incremental loading, and incremental code generation.

FIG. 1 is a schematic illustration of a computer or data processing system 100 for implementing and utilizing an embodiment of the invention. The computer system 100 includes one or more processing elements, such as a processing element 102, a main memory 104, user input/output (I/O) 106, a data storage unit, such as a disk drive 108, and a removable medium drive 110 that are interconnected by a system bus 112. The computer system 100 may also include a communication unit, such as a network interface card (NIC) 114. The user I/O 106 may include a keyboard 116, a pointing device, such as a mouse 118, and a display 120. Other user I/O 106 components include voice or speech command systems, other pointing devices include touchpads and touchscreens, and other output devices besides a display, such as a printer, a projector, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 104 may store a plurality of program libraries or modules, such as an operating system 122, and one or more application programs that interface to the operating system 122, including a modeling environment application 200.

The removable medium drive 110 may accept and read a computer readable medium 126, such as a CD, DVD, floppy disk, solid state drive, tape, flash memory or other medium. The removable medium drive 110 may also write to the computer readable medium 126.

Suitable computer systems include personal computers (PCs), workstations, laptops, tablets, palm computers, smart phones, electronic readers, and other portable computing devices, etc. Nonetheless, those skilled in the art will understand that the computer system 100 of FIG. 1 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 200 may be hosted on a server, and accessed by a remote client through an application hosting system, such as the Remote Desktop Connection tool from Microsoft Corp.

Suitable operating systems 122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others.

As indicated above, a user or developer, such as an engineer, scientist, programmer, etc., may utilize one or more input devices, such as the keyboard 116, the mouse 118, and the display 120 to operate the modeling environment 200, and construct one or more models of a system that is being designed or evaluated. The models may be computational and may have executable semantics. In particular, the models may be executable. In particular, the model may provide one or more of time-based, event-based, state-based, frequency-based, control-flow based, and dataflow-based execution semantics. The execution of a model may simulate operation of the system that is being designed or evaluated.

In an embodiment, the modeling environment 200 is a high-level modeling environment. Suitable high-level modeling environments include the MATLAB® and Simulink® technical computing environments from The MathWorks, Inc. of Natick, Mass., as well as the Simscape physical modeling system and the Stateflow charting tool also from The MathWorks, Inc., the MapleSim physical modeling and simulation tool from Waterloo Maple Inc. of Waterloo, Ontario, Canada, the LabVIEW programming system from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., the Scade product family of Esterel Technologies, Inc., and the graphical modeling system described in U.S. Pat. No. 7,324,931 for Conversion of Model Components Into References, and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, and SystemC programming languages. Models may be specified graphically, textually, or a combination of graphically and textually.

Those skilled in the art will understand that the MATLAB® technical computing environment is a math-oriented, textual programming environment, for example for control law design, digital signal processing (DSP) design, etc. The Simulink® technical computing environment is a graphical, block-based, model-based design environment for modeling and simulating dynamic systems, among other uses. The MATLAB and Simulink tools provide a number of high-level features that facilitate algorithm development and exploration, and support model-based design. Exemplary high-level features include dynamic typing, array-based operations, data type inferencing, sample time inferencing, and execution order inferencing, among others.

In another embodiment, a lower level language may be used to create the model instead of a high-level modeling environment. This lower level language may be a programming language, such as the C, C++, and C# programming languages, among others; a hardware description language, such as VHDL and Verilog description languages, among others; and combinations of various languages.

Figure 2:
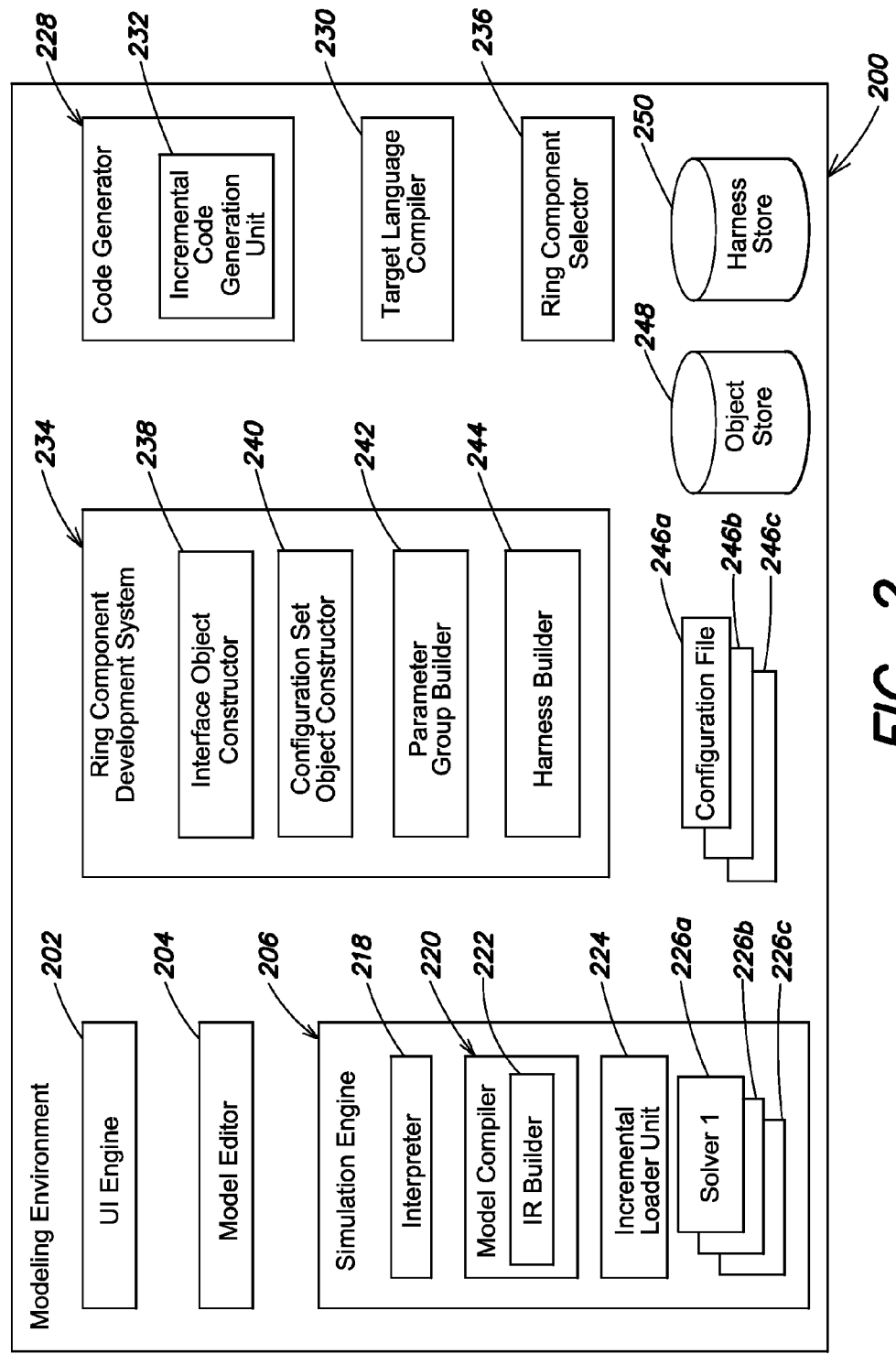
FIG. 2 is a partial functional diagram of a modeling environment in accordance with an embodiment of the present invention.

FIG. 2 is partial block diagram of an embodiment of the modeling environment 200. The environment 200 may include a user interface (UI) engine 202, a model editor 204, and a simulation engine 206. The simulation engine 206 may include an interpreter 218, a model compiler 220 that, in turn, may include one or more Intermediate Representation (IR) builders, such as IR builder 222, an incremental loader unit 224, and one or more, and preferably a plurality, of solvers, such as solvers 226a-c. Exemplary solvers include one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the *Simulink 7 User's Guide* from The MathWorks, Inc. (September 2011 ed.), which is hereby incorporated by reference in its entirety.

The modeling environment 200 may include other components, such as a code generator 228, and a target language compiler 230. The code generator 228 may include an incremental code generation unit 232. Suitable code generators for use with the present invention include, but are not limited to, the Simulink Coder, the Embedded Coder, and the Simulink HDL Coder products from The MathWorks, Inc., the System Generator for DSP product from Xilinx, Inc., of San Jose, Calif., and the TargetLink product from dSpace GmbH of Paderborn Germany. Those skilled in the art will understand that other code generation systems may be used.

In an embodiment, a ring component development system 234 and a ring component selector unit 236 may be integrated with the modeling environment 200. For example, the ring component development system 234 may be built into the environment 200. Alternatively, the ring component development system 234 may be separate from the modeling environment 200, but in communicating relationship with it. The ring component development system 234 may include one or more modules. For example, the ring component development system 234 may include one or more of an interface object constructor 238, a configuration set object constructor 240, a parameter group builder 242, and a harness builder 244. The ring component development system 234 may include or have access to one or more configuration files, such as configuration files 246*a-c*, an object store 248, and a harness store 250. The configuration files 246*a-c*, object store 248, and harness store 250 may be part of the modeling environment 200.

The interface object constructor 238, configuration set object constructor 240, parameter group builder 242, and harness builder 244 of the ring component development system 234 and the ring component selector 236 may each comprise registers and combinational logic configured and arranged to produce sequential logic circuits. In an embodiment, the interface object constructor 238, configuration set object constructor 240, parameter group builder 242, harness builder 244, and ring component selector 236 may be implemented through one or more software modules or libraries containing program instructions pertaining to the methods described herein. The software modules may be stored on main memory 104 and/or computer readable media, such as computer readable medium 126, and executable by one or more processing elements, such as processing element 102. Other computer readable media may also be used to store and execute these program instructions. In alternative embodiments, various combinations of software and hardware, including firmware, may be utilized to implement the present invention.

The configuration files 246, object store 248, and harness store 250 may be implemented through files, repositories, databases, etc., or other data structures. They may be stored on main memory 104, persistent memory 108, and/or medium 126. In an embodiment, a ring component (or ring information) may be stored in the same file, such as a zip file, that stores the parent model (or parent model information). In another embodiment, a ring component and a parent model may be stored in separate files. If a ring component is stored in a separate file, it may be referenced from multiple parent model files and/or multiple call sites within a parent model, thereby removing duplication. Moreover, if stored separately, the ring component may be placed under version control by a file-based version control system. In a further embodiment, a ring component may be stored in the same file as the referenced model to which the ring component is assigned, or the ring component and the referenced model may be stored in separate files.

FIGS. 3A-D illustrate a flow diagram of a method in accordance with an embodiment of the invention. The modeling environment 200 may receive inputs, e.g., on behalf of a user, opening, constructing, editing, or analyzing one or more models, which may be stored in main memory 104 or persistent memory 108, as indicated at block 302. For example, a user may select a plurality of graphical objects, such as icons or blocks, from one or more libraries of pre-defined objects, and place the selected objects onto a model canvas that may be managed by the model editor 204. The user also may establish relationships, such as connections, among the blocks, which may or may not be visually represented on the model canvas. The graphical objects of the model may represent, for example, dynamic systems, computations, functions, operations, or states, and the connections, which may appear as wires or arrows, among the objects may represent, for example, data, control, signals, events, transitions, mathematical relationships, or physical connections. A set of interconnected blocks may be organized into a subsystem, and a set of graphical state objects may be organized into a state chart or subchart. A model may include one or more blocks, subsystems, and/or state charts.

In particular, the UI engine 202 and model editor 204 may provide or support a graphical user interface (GUI) that includes the model canvas for displaying a model. The model may be a Simulink model, a Stateflow chart, a LabVIEW block diagram, a VEE diagram, a MATLAB file, a MatrixX model, etc. The model may represent a dynamic system, such as an aircraft flight controller, an engine control unit (ECU), an embedded system, etc.

The model may be intended for use within another, e.g., a parent, model. When added to the parent model, the model may be represented by a single model reference block, and may be identified as a sub-model or a referenced model.

A plurality of ring components may be created for the referenced model, as indicated at block 304. The ring components may be stored in one or more of the configuration files 246, object store 248, and harness store 250, as indicated at block 306. Each ring component may define different characteristics for the referenced model, and may thus result in a different execution, static analysis, and/or code generation behavior of the referenced model. The referenced model may be added to a parent model, as indicated at block 308. For example, a model reference block that provides a reference to the referenced model may be added to the parent model. At least one of the plurality of ring components may be selected for the referenced model as part of the parent model, as indicated at block 310. The selection of the particular ring component may be performed by the ring component selector 236. For example, in response to user input or programmatic action, a particular ring component may be identified to or by the ring component selector 236. Ring component selector 236 may then associate, e.g., assign, this identified ring component to the referenced model as included in the parent model, as indicated at block 312. The user may select a ring component that makes the referenced model compatible with the parent model. For example, the user may examine model-level characteristics for the parent model as well as characteristics of the portion of the parent model that interfaces to the referenced model. The user may select a ring component that provides the referenced model with compatible characteristics to the parent model and to the portion of the parent model that interfaces to the referenced model. For example, such characteristics may include signal attributes, such as fixed point and floating point data types, different solver types, different hardware configurations, and different targets for generated code, among others.

Figure 3A:
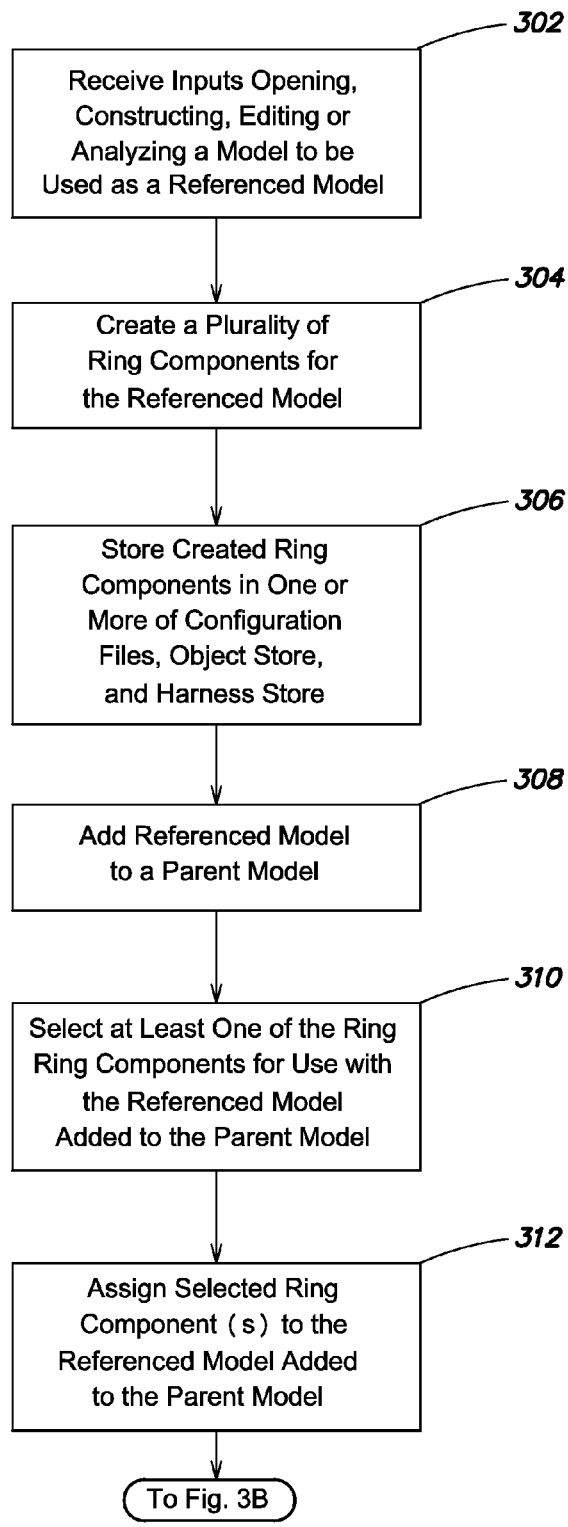
FIGS. 3A-D is a flow diagram of a method in accordance with an embodiment of the present invention.
Figure 3B:
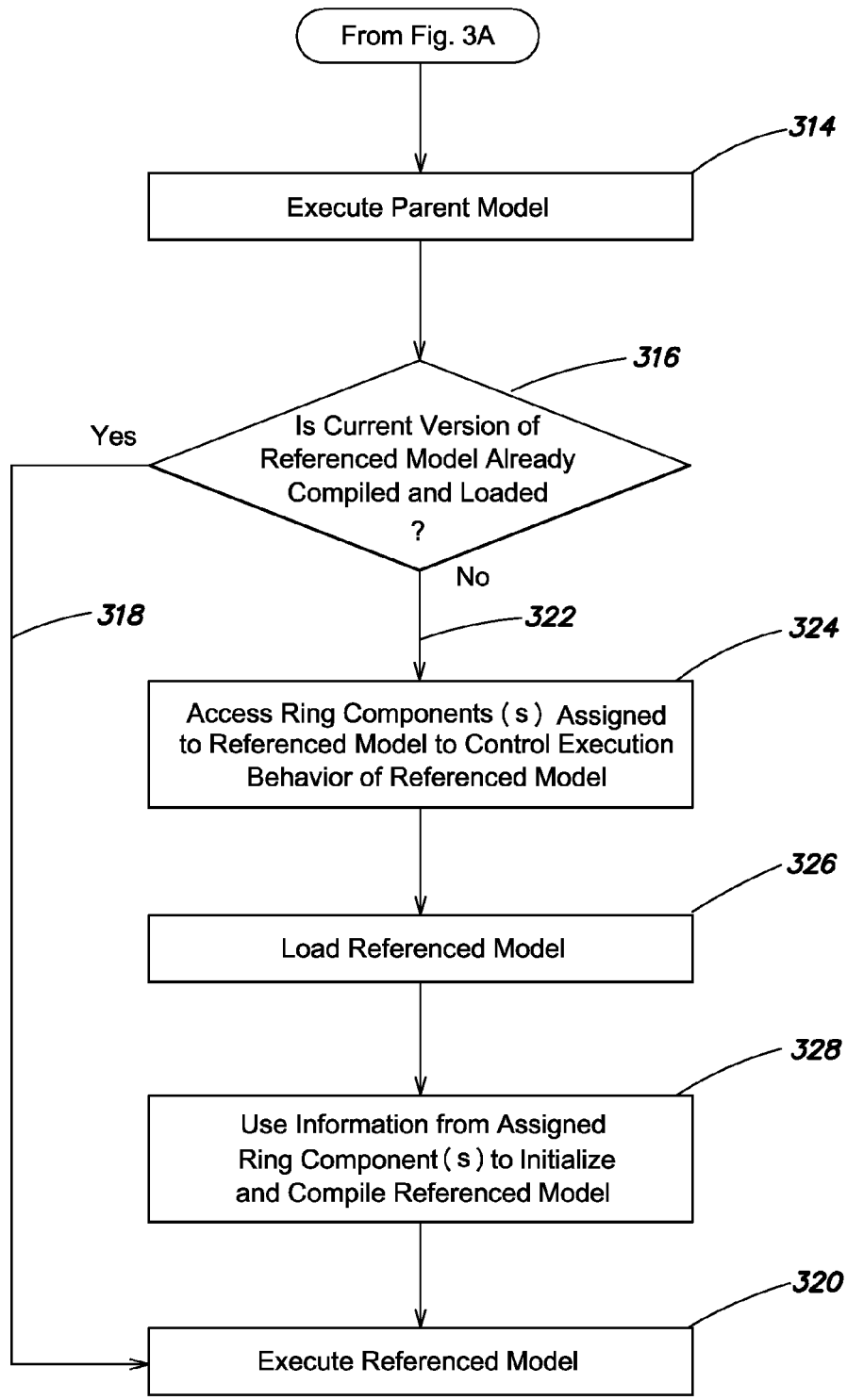
Figure 3C:
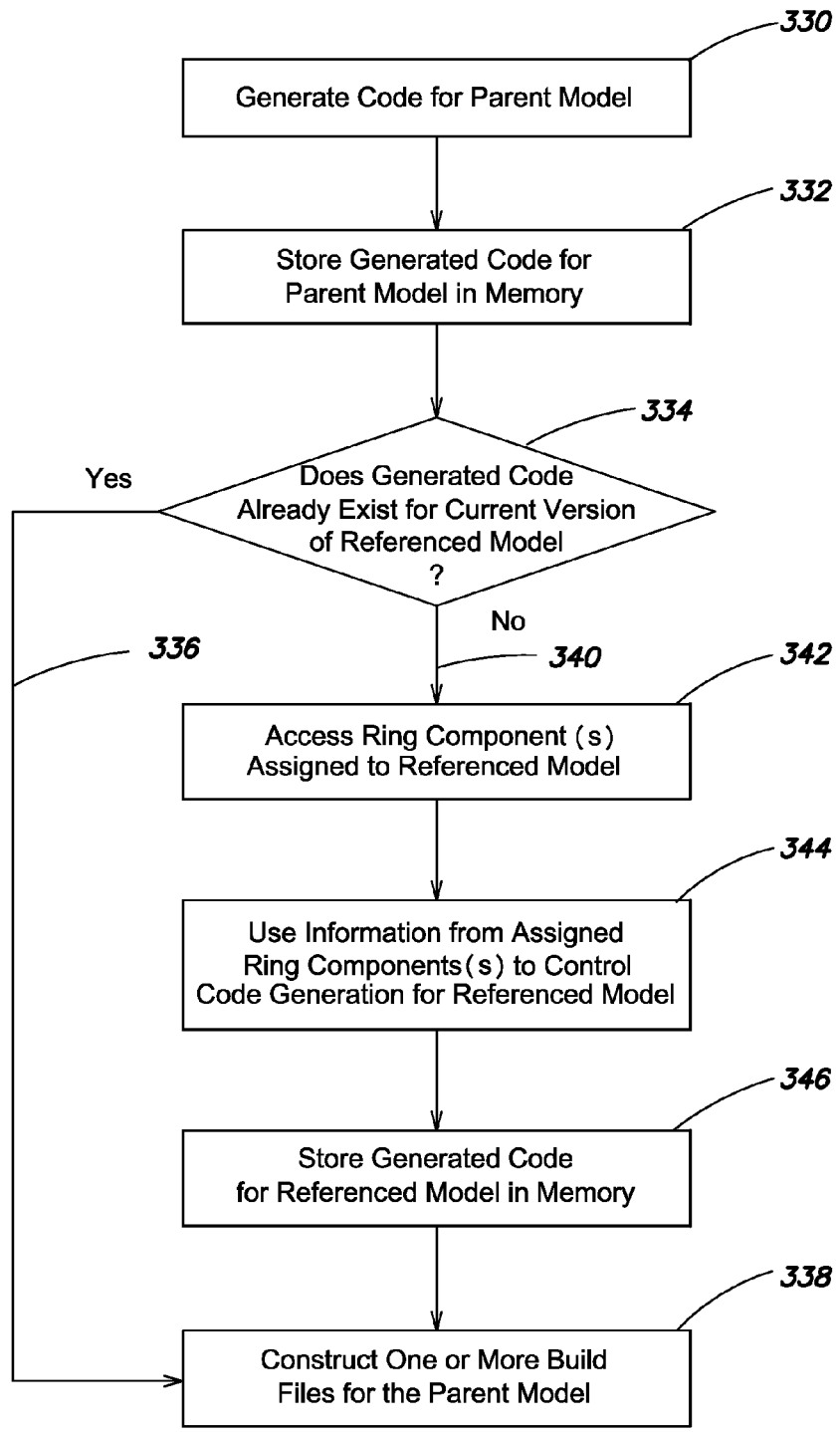

The parent model, which now includes the referenced model, may be executed, as indicated at block 314 (FIG. 3B). For example, the GUI created by the UI engine 202 may include a plurality of command buttons, including a Run button, that may be selected by the user. The UI engine 202 may also provide or support a Command Line Interface (CLI) that may receive a text-based run command entered by the user. In response to the user selecting the Run button or entering the run command (or initiating execution otherwise, for example, by means of a keyboard shortcut, a menu selection, etc.), the simulation engine 206 may execute or simulate the graphical model, and may output the results produced by the model's execution, for example, to the user via the display 120.

Model execution may be carried out over a user-specified time span for a set of user-specified inputs. A compile stage may mark the start of model execution and may involve preparing data structures and evaluating parameters, configuring and inferring (e.g., by propagating) block characteristics, determining block connectivity, and performing block reduction and block insertion. The preparation of data structures and the evaluation of parameters may create and initialize basic data-structures needed in the compile stage. For each of the blocks, a method may force the block to evaluate all of its parameters. This method may be called for a subset of or all blocks in the parent model. If there are any unresolved parameters, execution errors or warnings may be thrown. During the configuration and inferring of block and port/signal characteristics, the compiled attributes (such as dimensions, data types, complexity, or sample time) of each block (and/or ports) may be setup on the basis of the corresponding behaviors and the attributes of blocks (and/or ports) that are connected to the given block through lines. For example, the attribute setup may be performed through a process such as, for example, propagation, during which block behaviors "ripple through" the parent model from one block to the next following signal connectivity.

This process referred to as "propagation" may serve two purposes. In the case of a block that has explicitly specified its block (or its ports') behaviors, propagation helps ensure that the attributes of this block are compatible with the attributes of the blocks connected to it. If not, an error or warning may be issued. Secondly, in many cases blocks are implemented to be compatible with a wide range of attributes. Such blocks may adapt their behavior in accordance with the attributes of the blocks connected to them. This is akin to the concept of polymorphism in object-oriented programming languages. The exact implementation of the block may be chosen on the basis of the model in which the block finds itself. Included within this step are other aspects such as validating that all rate-transitions yield deterministic results, and that the appropriate rate transition blocks are being used. The compilation step also may determine actual block connectivity. For example, virtual blocks may play no semantic role in the execution of a block diagram. In the compilation step, the virtual blocks may be optimized away (removed) and the remaining non-virtual blocks are reconnected to each other appropriately. This compiled version of the parent model with actual block connections may be used from this point forward in the execution process. The way in which blocks are interconnected in the parent model does not necessarily define the order in which the equations (methods) corresponding to the individual blocks will be solved (executed). The actual order may be determined during the sorting step in the compilation step. In an embodiment, once the compilation step has completed, the sorted order may not be changed for the entire duration of the block diagram's execution.

This same compilation stage may also be performed for the referenced model, which represents a stand-alone model that is separate from the parent model. In particular, the incremental loader unit 224 may determine whether the referenced model will be called during this execution of the parent model. If the referenced model will not be called, the incremental loader unit 224 does not compile or load it into memory. If the referenced model will be called, the incremental loader unit 224 may determine whether the current version of the referenced model has already been compiled and loaded into memory, as indicated at decision block 316. If it has, the process need not be repeated, and the referenced model, as previously compiled and loaded may be executed, as indicated by Yes arrow 318 leading to block 320. If the referenced model or the corresponding ring component has changed, the model compiler 220 may access the one or more ring components that were determined to be assigned to the referenced model, as indicated by No arrow 322 leading to block 324. The simulation engine 206 may load the referenced model in memory, such as main memory 104, as indicated at block 326. The model compiler 220 may then utilize the one or more ring components assigned to initialize and compile the referenced model, so that the referenced model will have the desired execution behavior within the parent model, as indicated at block 328. The simulation engine 206 may execute the referenced model, loaded in memory, as part of the execution of the parent model, as indicated at block 320.

A parent model may make multiple calls to the same referenced model, and these calls may be referred to as call sites within the parent model. Different ring components may be associated with the referenced model at the call sites. In addition, the determination whether to compile the referenced model may depend on whether the referenced model has changed or whether the ring component associated with the referenced model at each respective call site has changed.

In an embodiment, a single ring component may be assigned to a referenced model included within a parent model.

Following the compilation stage, code may or may not be generated, as indicated below. If code is generated, the parent model may be simulated/executed through accelerated execution mode in which the parent model (or portions of it) is translated into either software modules or hardware descriptions (broadly termed code). If this stage is performed, then the stages that follow use the generated code during the execution of the parent model. If code is not generated, the parent model may execute in interpretive mode in which the compiled and linked version of the parent model may be directly utilized to execute the parent model over the desired time-span. This interpretive mode of execution may be suitable for getting fine-grained signal traceability. There are several different advantages to execution through code generation. Execution of generated code can be more efficient than interpretive execution because of fewer data-structures and lesser internal messaging in the engine when compared to the data structures and messaging created during interpretive execution, although the increased efficiency generally comes at the cost of decreased execution traceability. Simulation of hardware descriptions during execution can help identify and resolve bugs in the software stage of a design project. Additionally, block diagram modeling software can be integrated with other software environments that are suitable for modeling and executing special classes of systems. Models can be tested directly in hardware. Those skilled in the art will recognize that when users generate code, they may choose to not proceed further with the model's execution. They may choose to take the code and deploy it outside of the confines of the modeling environment 200.

In addition, the code generator 228 may generate code for the parent model, as indicated at block 330 (FIG. 3C), and may store the generated code for the parent model in memory, e.g., persistent memory, such as the hard drive 108, as indicated at block 332. Code generation may follow execution of the parent model, or it may be performed without executing the model. The UI engine 202 may provide or support a Code Generation button in the GUI that may be selected by the user, or the UI engine 202 may receive a code generation command entered by the user, e.g., in the GUI or the CLI. The code generation command also may be invoked programmatically, for example, when a particular event occurs, such as a model passing verification, etc. In response to the code generation command being activated, the code generator 228 may generate code for the model, and may store the generated code in memory. In an embodiment, the generated code may be textual code, such as textual source code, that may be compiled and executed on a target machine or device. The generated code may conform to one or more programming languages, such as Ada, Basic, C, C++, C#, SystemC, FORTRAN, embedded MATLAB, etc., to a description language, such as VHDL, Verilog, a vendor or target specific HDL code, such as Xilinx FPGA libraries, etc., or to assembly code. For example, one or more code generation files, such as header, main, make, and other source files may be generated for the parent model.

The incremental code generation unit 232 may determine whether code has already been generated for the current version referenced model, as indicated at decision block 334. If so, the code generator may re-use this previously generated code, e.g., as part of one or more build files for the parent model, as indicated by Yes arrow 336 leading to block 338. If code has not been previously generated for the referenced model, or the referenced model has been changed since prior code was generated, the code generator 228 may access the ring component(s) for the referenced model, as indicated by No arrow 340 leading to block 342. The code generator 228 may utilize information from the one or more assigned ring component(s) to control the code generation process for the referenced model, as indicated at block 344. The process of generating code for the referenced model may be separate from the generation of code for the parent model, although the procedures used may be the same. Computer programming code, such as source files, generated for the referenced model may be saved, e.g., in memory, such as main memory 104, as indicated at block 346, and may be used in the constructions of one or more build files for the parent model, as indicated at block 338. Code generated for the referenced model thus incorporates the desired behavior, as specified through the selected ring component(s).

Figure 3D:
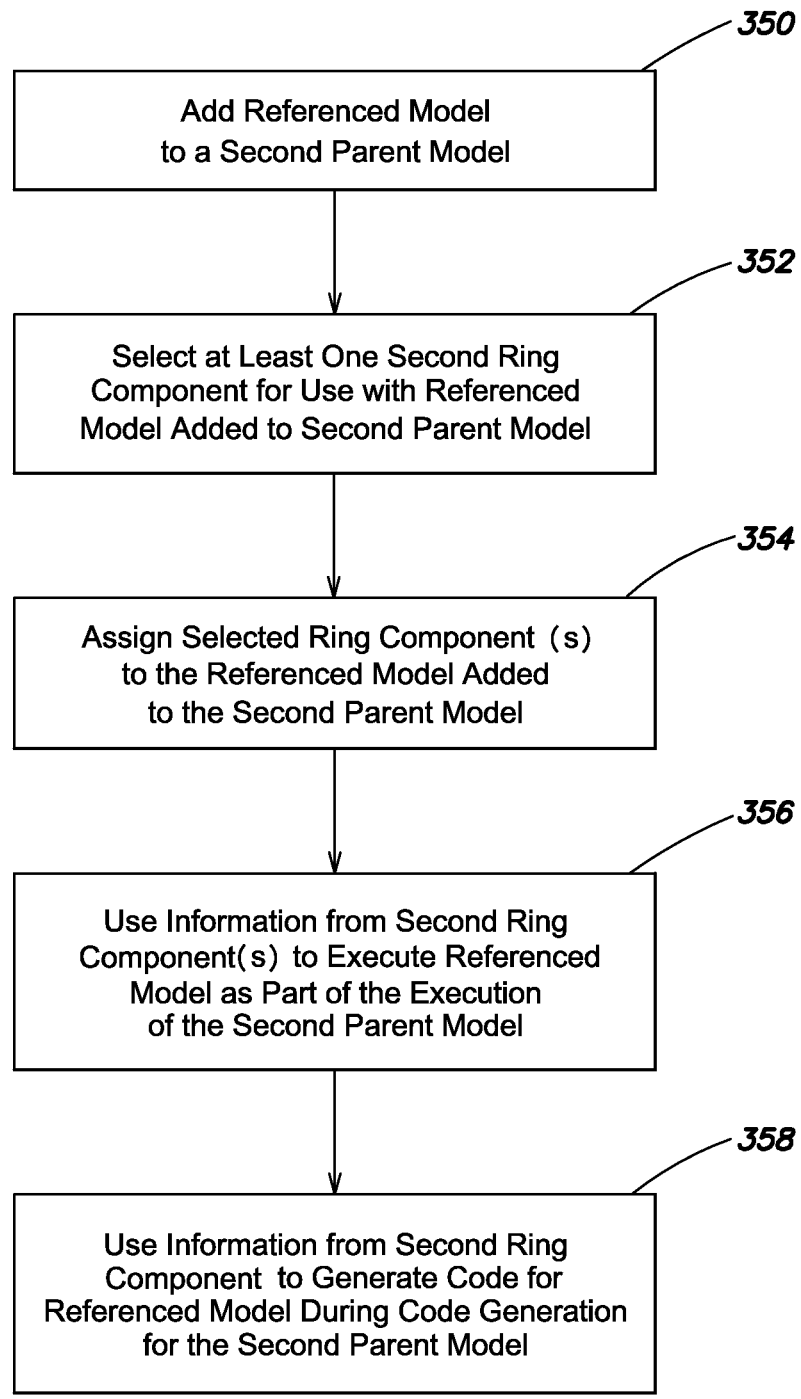

The referenced model may be added to a second parent model that is different from the first parent model, as indicated at block 350 (FIG. 3D). In addition, one or more second ring components may be selected for use with the referenced model as included in this second parent model, as indicated at block 352. The characteristics of at least that portion of the second parent model that interfaces to the referenced model may differ from the characteristics of the interface at the first parent model. Accordingly, the one or more ring components that are selected for this use of the referenced model, i.e., within the second parent model, may differ from the one or more ring components that were selected for the use of the referenced model in the first parent model. The selected ring component(s) may be assigned to the referenced model, as indicated at block 354. The simulation engine 206 may utilize information from the second ring component(s) during execution of the referenced model within the context of the parent model, as indicated at block 356. The code generator 228 may use information from the second ring component(s) during the process of generating code for the referenced model within the context of generating code for the parent model, has indicated at block 358.

In addition, the configuration of the parent model that includes the referenced model may be changed. The new configuration may not be compatible with the referenced model when the first ring component is assigned to the referenced model. In this case, a second ring component may be selected and assigned to the referenced model contained in the reconfigured parent model.

By selecting and associating different ring components with the same referenced model depending on the particular parent model to which the referenced model is added, different execution and/or code generation modes or behaviors may be achieved for the referenced model, without having to modify the referenced model. That is, the referenced model may remain unchanged. In addition, a different ring component may be associated with a second call site to the referenced model from within the parent model.

A model, such as a parent model, also may be subjected to static analysis, which may also be referred to as model checking, model verification, formal methods, and abstract interpretation, among other terms. The parent model may include calls to one or more referenced models and/or multiple calls to the same referenced model. For each call to a referenced model, a selected ring component may be assigned. The parent model may then be subjected to the static analysis. The assigned ring component may influence the behavior of the respective referenced model, and thus affect the results of the static analysis. For example, one or more errors may be identified when a first ring component is assigned to a referenced model, while different or no errors may be identified when a second ring component is assigned to the referenced model. The results of such static analysis testing may be used in the selection of a particular ring component for subsequent execution and/or code generation for the parent model.

In addition, static analysis may be performed on a referenced model and its assigned ring component, rather than or in addition to performing static analysis on a parent model.

Furthermore, code may be generated for a parent model, which has calls to one or more referenced models and/or multiple calls to the same referenced model. The results of the static analysis of the generated code, moreover, may differ depending on the ring component assigned to the referenced model.

Suitable tools for performing static analysis include the Simulink Design Verifier tool and the Polyspace® code verifier both from The MathWorks, Inc.

Interface Objects

In an embodiment, a ring component may be implemented, entirely or at least partially, through one or more interface objects constructed for the referenced model. The interface object constructor 238 may be configured to construct an interface object from a class, such as a base class. An interface object may define a plurality of properties, and the constructor 238 may specify values for these properties during construction, e.g., instantiation, of the interface object. For example, values of the properties may be user-specified or machine-specified, e.g., specified programmatically.

Figure 4:
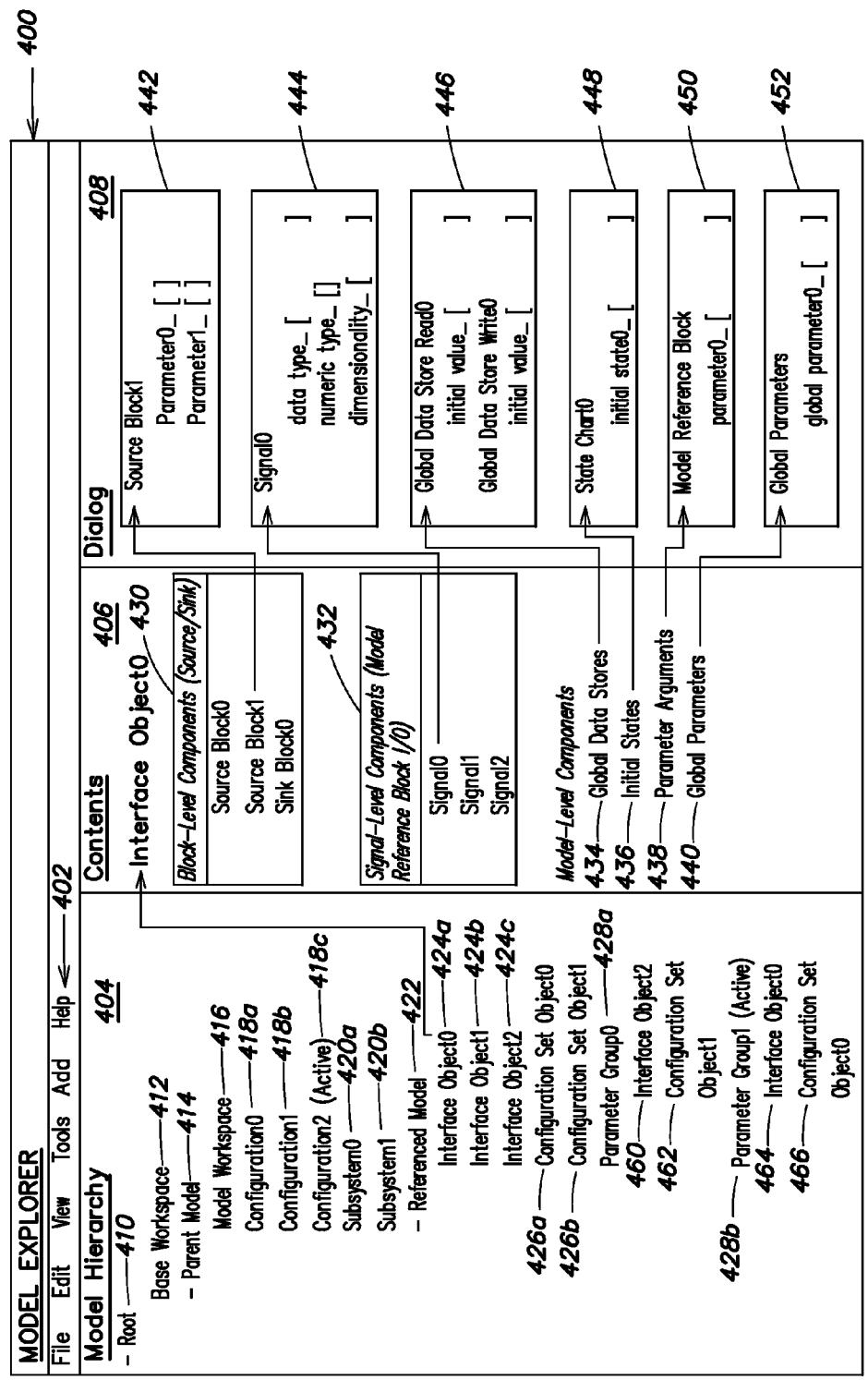
FIG. 4 is a schematic illustration of a Model Explorer window in accordance with an embodiment of the present invention.

In an embodiment, the model editor 204 may be configured to present a Model Explorer window, e.g., on display 120. FIG. 4 is a schematic illustration of a Model Explorer window 400 for a parent model having a referenced model. The Model Explorer window 400 may include a toolbar 402 having a plurality of tools, such as File, Edit, View, Tools, Add, and Help. The Model Explorer window 400 may also include a Model Hierarchy pane 404, a Contents pane 406, and a Dialog pane 408. The Model Hierarchy pane 404 may include a plurality of nodes that provide a tree-structured view of the parent model, which may be rooted at a Root node 410. Exemplary nodes include a Base Workspace node 412, and a Model node 414, which corresponds to the parent model. Nested within the Model node 414 are a plurality of nodes representing different elements of the parent model, for example a Model workspace node 416, one or more Configuration nodes 418a-c, one or more subsystem nodes 420a-b, and one or more referenced model nodes, such as Referenced Model node 422, that represents a referenced model within the parent model. Nested within the Referenced Model node 422 may be a plurality of nodes that represent elements of the referenced model, including a plurality of nodes representing various ring components associated with the referenced model. One or more of the ring components may be selected and assigned to the referenced model. For example, the Referenced Model node 422 may include one or more Interface Object nodes 424a-c, one or more Configuration Set Object nodes 426a-b, and one or more Parameter Group nodes 428a-b.

The modeling environment 200 may provide a plurality of different workspaces each having its own scope for defining variables, defining functions, and resolving symbol usage. For example, there may be a base workspace that may be accessible by all models. As noted, a model may include one or more state charts, and the base workspace also may be accessible by one or more state charts. In addition, each model and state chart may be provided with its own model workspace or state chart workspace, and variables, functions, and symbols defined within the model or state chart workspace are only visible to that model or state chart.

The Contents pane 406 may provide a list of components associated with a node selected in the Model Hierarchy pane 404. To edit an existing interface object associated with the referenced model, the user may select its node, e.g., node 424a, from the Model Hierarchy pane 404. In response to the selection of an interface object node 424a (for Interface Object0), the interface object constructor 238 may present the components of the interface object in the Contents pane 406. In an embodiment, an interface object includes one, more, or all, of the following components: a block-level input/output component 430, a signal-level input/output component 432, and one, more or all model-level components that relate to input to or output from the referenced model. Exemplary model-level components include a global data stores component 434, an initial states component 436, a parameter arguments component 438, and a global parameters component 440.

The user may select one of these components from the Contents pane 406. In response, the interface object constructor 238 may configure the Dialog pane 408 to provide one or more data entry fields, such as drop down menus, text boxes, radio buttons, etc., for receiving information specifying one, more, or all values for the component. The interface object constructor 238 may set a property of the interface object being constructed to a value corresponding to the information entered or selected in the data entry fields.

In an embodiment, the block-level I/O component 430 may contain entries for each source and sink block of the referenced model. Alternatively, the block-level I/O component 430 may contain entries for just the source blocks of the referenced model. A source block is a block that has no inputs, such as a Sine Wave block, an Inport block, etc. A sink block is a block that has no outputs, such as an Outport block, a From Workspace block, etc. The attributes of a signal output by a source block are a function of the block's parameters and/or model parameters. The attributes of a signal output by a non-source block may be a function of the attributes of the input signal to the block, through a process of propagation, and the block's parameters. A signal that is written by a parent model and read by a referenced model may be represented in the referenced model as an Inport block, which is a source block. A signal being written by the referenced model and read by the parent model may be represented in the referenced model by an Outport block, which is a non-source block. That is, an Inport block may read a signal generated by one or more blocks of the parent model to which the referenced model is connected, and that signal may, in turn, be read and processed by other blocks of the referenced model. One or more blocks of the referenced model may compute a signal, and an Outport block of the referenced model may write the computed signal. That signal may be read by one or more blocks of the parent model to which the referenced model is connected.

The blocks of the referenced model, including the source and sink blocks, may have parameters whose values may be set. A block parameter refers to a value, for example a coefficient, that is used by the block's method to compute the block's output. For example, a parameter of a Gain block is the gain value. A parameter of a Constant block is the constant value.

The interface object constructor 238 may evaluate the referenced model and identify its source and sink blocks. Individual entries for these blocks may be included in the block-level I/O component 430 of the Contents pane 406. Upon selection of such an entry, such as the entry for Source Block1, one or more data entry fields, such as text boxes, may be presented in a respective region, such as a first region 442, of the Dialog pane 408. The data entry fields may correspond to block parameters of the selected source or sink block. A user may enter information in the data entry fields, for example the user may enter a value in one of the text boxes, and the interface object constructor 238 may set a property of the interface object that is associated with the respective block parameter to that value.

The signal-level I/O component 432 may include entries for the input and output signals of the referenced model. The interface object constructor 238 may evaluate the referenced model, and identify the model's input and output signals. Individual entries for the identified input and output signals may be included in the signal-level I/O component 432 of the Contents pane 406. Upon selection of an entry, such as the entry for Signal0, one or more data entry fields may be presented in a second region 444 of the Dialog pane 408. The data entry fields may correspond to attributes of the selected input or output signal, e.g., Signal0. The attributes of a signal, such as an input or output signal, may include data type, numeric type, dimensionality, and sampling mode.

Examples of data types include unsigned 8-bit integer, double-precision floating point, single-precision floating point, and fixed point. Examples of numeric type include real or complex. Examples of dimensionality include one-dimensional, e.g., scalars and vectors, two-dimensional, e.g., arrays, or multidimensional, e.g., multi-dimensioned matrices. Examples of sampling modes include sample-based, in which a signal has one data sample, and frame-based, in which a signal includes a batch of data samples. A user may enter information in the data entry fields or choose available options, and the interface object constructor 238 may set a property of the interface object that is associated with the respective input or output signal to the received value.

In response to the selection of the global data stores component 434, the interface object constructor 238 may provide one or more data entry fields in a third region 446 of the Dialog pane 408 for receiving values, such as initial or default values, for the global data stores, if any, included in the referenced model. Exemplary global data stores include data store memory reads and data store memory writes. A user may enter information in the data entry fields, and the interface object constructor 238 may set a property of the interface object that is associated with the respective global data store to the received value.

In response to the selection of the initial states component 436, the interface object constructor 238 may provide one or more data entry fields in a fourth region 448 of the Dialog pane 408 for receiving values for the referenced model's initial states. Exemplary initial states include an initial state of a state chart included in the referenced model, and an initial state of a block of the referenced model. A user may enter information in the data entry fields, and the interface object constructor 238 may set a property of the interface object that is associated with the respective initial state of the referenced model.

In response to the selection of the parameter arguments component 438, the interface object constructor 238 may provide one or more data entry fields in a fifth region 450 of the Dialog pane 408 for receiving values for the referenced model's parameter arguments. A parameter argument may refer to a parameter of a referenced model, as opposed to a parameter of a particular block of the referenced model. A user may enter information in the data entry fields, and the interface object constructor 238 may set a property of the interface object that is associated with the respective parameter argument of the referenced model to the received value.

In response to the selection of the global parameters component 440, the interface object constructor 238 may provide data entry fields in a sixth region 452 of the Dialog pane 408 for receiving values for the referenced model's global parameters. A global parameter may refer to a parameter specified in the base workspace that is utilized by the referenced model. A user may enter information in the data entry fields, and the interface object constructor 238 may set a property of the interface object that is associated with the respective global parameter of the referenced model to the received value. For example, a referenced model may include a Gain block whose gain is set to a variable, e.g., 'x' that is defined in the base workspace. In a first interface object, this global variable, 'x', may be set to a first value, e.g., '12', while in a second interface object, 'x' may be set to a second value, e.g., '112'.

It should be understood that the interface object constructor 238 may evaluate the referenced model and determine whether it includes any global data stores, initial states, parameter arguments, and global parameters. If so, entries for these identified global data stores, initial states, parameter arguments, and global parameters may be included in the Contents pane 406 of the Model Explorer Window 400.

An interface object may thus contain values for model-level components, block-level components, and signal-level components relating to the inputs and outputs of the referenced model. The values may be user-specified or machine-specified, for example, the values may be specified programmatically, such as through an executable script user.

To create a new interface object, a user may select an 'Interface Object' sub-tool from the Add tool of the toolbar 402 of the Model Explorer 400. In response, the interface object constructor 238 may cause a new Interface Object node to be added to the Referenced Model node 422 in the Model Hierarchy pane 404.

The user may direct the interface object constructor 238 to construct multiple interface objects for the referenced model. Each interface object may have one or more property values that differ from the values of other interface objects constructed for the referenced model. For example, a first interface object may specify a double-precision floating point data type for an input signal, such as one of a signal associated with a first Inport block, a first value for a global data store, and a first initial value for the referenced model, for example for a block or a state chart. A second interface block may specify a fixed-point data type for the input signal, a second value for the global data store, and a second initial value, e.g., for the block or the state chart. The interface object constructor 238 may store each such interface object for the referenced model in the object store 248.

Each time the referenced model is added to a parent model, the interface objects created for the referenced model may be made available for selection. For example, the model hierarchy pane 404 of the Model Explorer window 400 for the parent model to which the referenced model has been added may include an entry for the referenced model, and the hierarchy for this entry may include an entry for each one of the interface objects constructed for the referenced model. A particular one of the interface objects may be selected, and assigned to the referenced model. To choose a particular interface object, the user may select it from the model hierarchy pane, and designate it as the Active interface object for the referenced model. Alternatively, the particular interface object may be selected through programmatic action.

Configuration Set Objects

In another embodiment, a ring component may be implemented, entirely or at least partially, through a configuration set object. The configuration set object constructor 240 may be configured to construct a configuration set object from a class. A configuration set object may contain information regarding one or more model-level settings for the referenced model.

Figure 5:
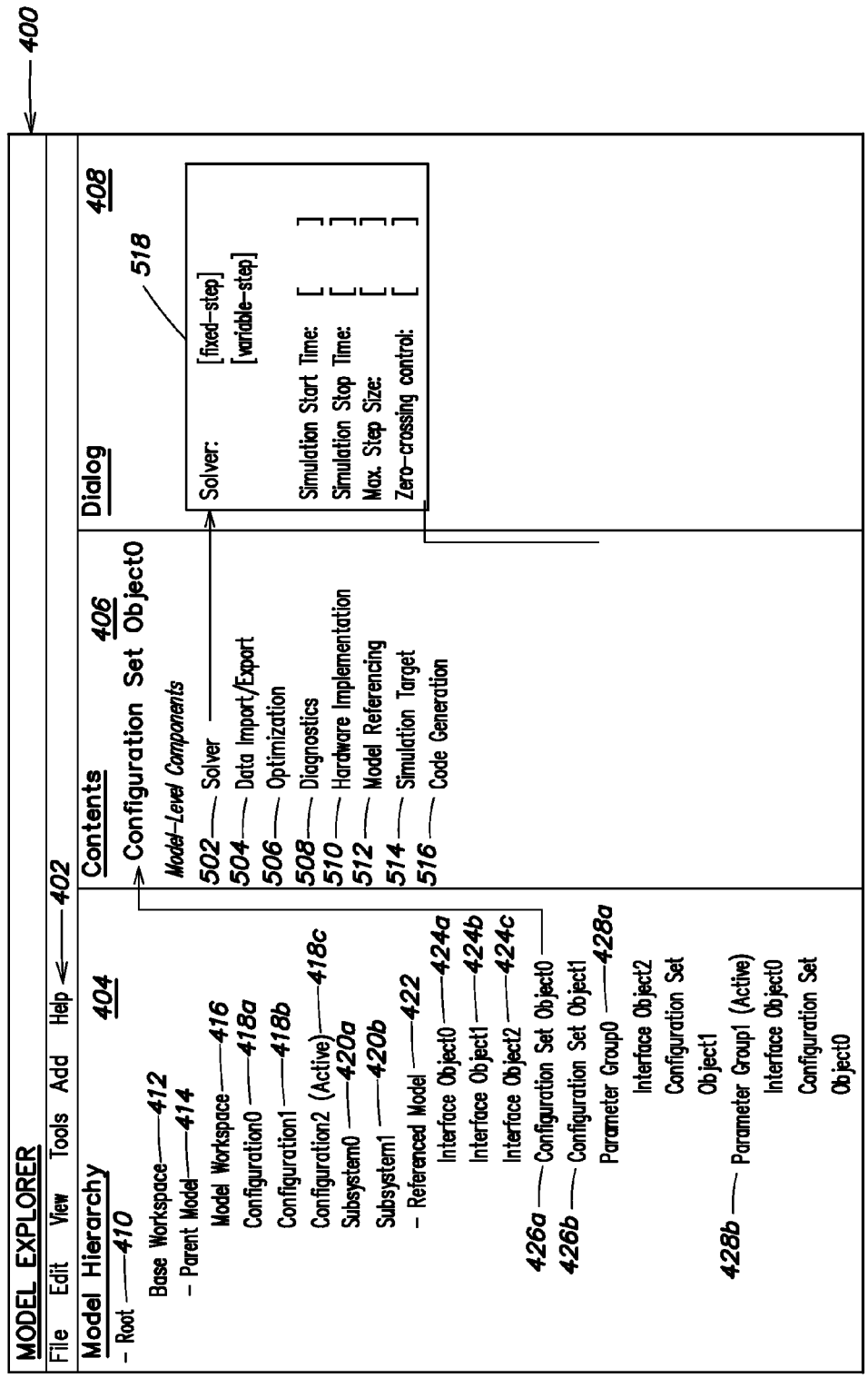
FIG. 5 is a schematic illustration of a Model Explorer window in accordance with another embodiment of the present invention.

To specify the model-level settings of a configuration set object, the user may select the respective configuration set object node from the Model Hierarchy pane 404 of the Model Explorer window 400. FIG. 5 is a schematic illustration of the Model Explorer window 400 for setting values for a selected configuration set object. In response to the selection of a particular configuration set object node, such as Configuration Set Object0 node 426a, the configuration set object constructor 240 may present the components of the selected configuration set object in the Contents pane 406. In an embodiment, a configuration set object includes one, more, or all of the following components: a Solver 1 component 502, a Data Import/Export component 504, an Optimization component 506, a Diagnostics component 508, a Hardware Implementation component 510, a Model Referencing component 512, a Simulation Target component 514, and a Code Generation component 516.

The user may select one of these components, for example, the Solver component 502, from the Contents pane 406. In response, the configuration set object constructor 240 may configure a first region 518 of the Dialog pane 408 to provide one or more data entry fields for receiving information regarding the particular solver to be used with the referenced model. The information may include the selection of a solver, simulation start and stop times, a maximum step size (for variable step solvers), and a zero-crossing control, among others. Upon receiving the selection of a particular solver and other solver-related information, the configuration set object constructor 240 may set one or more properties, such as a solver type property, of the configuration set object being constructed based on the received information.

In a similar manner, the user may specify values for the other components of the configuration set object. The Data Import/Export component 504 may be used to specify information relating to the importation of input signals and initial state data from a workspace into the referenced model, and to the exportation of output signals and state data from the referenced model, for example to a workspace. The Optimization component 506 may be used to specify information regarding settings for optimizing the execution of the referenced model and/or the generation of code from the referenced model. Exemplary optimizations that may be specified include whether to perform block reduction, whether to perform conditional input branch execution, whether to generate initialization code for root-level inports and outports that are set to zero, etc. The Diagnostics component 508 may be used to specify diagnostic actions to be performed during execution of the referenced model. The Hardware Implementation component 510 may be used to specify embedded and emulation hardware settings for execution and code generation for the referenced model. The Model Referencing component 512 may be used to specify options for including other models within the referenced model, if any, and options for the inclusion of the referenced model in a parent model. The Simulation Target component 514 may be used to specify configuration settings for a simulation target when the referenced model includes textual code-based function blocks, state-based charts, or truth tables. The Code Generation component 516 may be used to specify settings for code generation for the referenced model.

Each configuration set object created for the referenced model may include a different set of values for the model-level components, such as different solvers, different optimization settings, different hardware implementation settings, etc.

In an embodiment, other techniques may be used to create, revise and select an interface object and/or a configuration set object. For example, one or more text-based commands may be entered in a Command Line Interface (CLI) provided by the UI engine 202. In particular, the interface object constructor 238 and/or the configuration set object constructor 240 may provide or support text-based commands, such as 'getInterfaceObj( )', getConfigSet( )', 'attachInterfaceObj( )', attachConfigSet( )', etc.

Parameter Groups

In yet another embodiment, a ring component may be implemented through one or more parameter groups. A parameter group, which may be implemented as a container, may store parameters, data, and objects, including a selected interface object and a selected configuration set object. The parameter group builder 242 may construct one or more, and in an embodiment a plurality of, parameter groups for a referenced model. A parameter group may include one or more parameters of blocks within the referenced model, and one or more attributes of signals of the referenced model. The parameter group builder 242 may create one or more data objects, such as a configuration file 246, and store block parameter and signal attribute information in the one or more configuration files 246 for the referenced model. The configuration files may be stored in the model file for the referenced model, or in one or more other locations.

A user may specify a first set of block parameter and signal attribute values of the referenced model within a first parameter group. This first set of block parameter and signal attribute values may then be saved by the parameter group builder 242 in one or more configuration files 246. The user may then specify a second set of block parameter and signal attribute values of the referenced model that differ from the values for the first set. This second set of block parameter and signal attribute values may be saved by the parameter group builder 242 as a second parameter group in one or more other configuration files 246. For example, the referenced model may include a bus creator block that combines a set of signals into a bus. A first parameter group may include a first set of initial values specified for the signals of the bus creator block, while a second parameter group may include a second set of initial values specified for the signals of the bus creator block. These initial values may be numeric values.

Parameter groups may be created and revised from within the Model Explorer window 400. For example, in response to the user selecting a parameter group node, such as Parameter Group node 428a, in the Model Hierarchy window 404, the parameter group builder 242 may present a list of components or elements of the selected parameter group in the Contents pane 406. This list of components or elements may include an interface object, a configuration set object, one or more sets of block-level attributes, such as block parameters, and one or more sets of signal-level attributes. Upon selection of a particular component or element from the list, the parameter group builder 242 may present one or more data entry fields in the Dialog pane 408 for receiving values or other information for the selected component. The user may enter desired values into the data entry boxes, and the values may be included in the parameter group.

When the referenced model is added to a parent model, the user may select a desired Parameter Group node, e.g., node 428a, and designate it as the Active parameter group node for the referenced model.

In an embodiment, a selected interface object may be added to a selected parameter group. That is, an interface object, which may specify one or more input and output related attributes for the referenced model, may be included within a parameter group. In addition, a selected configuration set object may be added to a selected parameter group. For example, referring to the Model Explorer window 400 (FIG. 4), Parameter Group0, represented by node 428a, may include Interface Object2, as indicated at entry 460, and Configuration Set Object1, as indicated at entry 462. Parameter Group1, which may be designated as the active parameter group for the referenced model, may include Interface Object0, as indicated at entry 464, and Configuration Set Object0, as indicated at entry 466.

Additionally, a user may set a parameter of a block of the referenced model through one or more dialog boxes or menus. For example, with the referenced model opened in a model editor, a user may call up a block parameters dialog box for a selected block of the referenced model, e.g., by selecting, such as double-clicking, the block. The block parameters dialog box may include one or more text or other data entry boxes for receiving values for the block's parameters. That is, for each block parameter, a data entry box may be provided for receiving a value for that block parameter. Similarly, a user may call-up a property page of a signal of the referenced model, such as the signal associated with a source block, and specify the attributes of the signal.

In addition, a parameter group may include one or more files. For example, different sets of block parameters may be serialized into a file, such as an eXtensible Mark-up Language (XML) file, a MATLAB programming environment (MAT) file, or other programming environment file, and the file may be included in a parameter group.

Harnesses

In yet a further embodiment, a ring component may be implemented as a harness for the referenced model. A harness may refer to a plurality of graphical objects, such as blocks, that may be selected and connected to the referenced model, and that specify one or more of model-level, block-level, and signal-level attributes for the referenced model. The harness builder 244 may include a library containing one or more graphical objects that may be used to construct a harness for the referenced model. A user may select one or more of these graphical objects, and add them to a canvas. A first harness-type graphical object may define at least one of a data type and data dimension for a first root-level input of the referenced model. A second harness-type object may define at least one of the data type and data dimension for a second root-level input of the referenced model. The harness builder 244 may save the harness in the harness store 250. Other examples of harness-type blocks include blocks that convert a sampling mode from frame-based to sample-based, and from sample-based to frame-based. In an embodiment, the harness builder 244 may utilize or have access to the libraries provided by the model editor 204.

A harness may be a separate model. By virtue of it being a separate model, one or more configuration set objects may be associated with the harness model, and one of them may be selected for assignment to the harness model. The selected configuration set object may define model-level settings for the harness model, such as solver, etc. Alternatively, a parameter group may be associated with and used in combination with the harness model.

The user may construct multiple different harness models for the referenced model, and the harness builder 244 may save these different harness models in the harness store 250. Upon adding the referenced model to a parent model, the user may select one of the harness models for use with the referenced model within the parent model. For example, harnesses, which may be named, may be saved in the model file for the referenced model, and queried or operated upon, e.g., for selection, through an Application Programming Interface (API).

In an embodiment, a harness influences the execution behavior and/or code generation characteristics of the referenced model. For example, one or more blocks of a harness may specify signal attributes, such as data type, data dimension, and sampling mode. Because the harness is connected to the referenced model, these attributes may propagate to the referenced model, thereby influencing the execution behavior and/or code generation characteristics of the referenced model as included in a parent model.

A ring component whether implemented as an interface object, a configuration set object, a parameter group, or a harness model, may be configured to lock down selected dynamics of the interface. For example, a ring component may be configured to enforce that a signal, such as an output signal of the referenced model, never increases beyond a certain slope, that it is always within a certain value range, that it settles in a certain time frame, that its frequency spectrum has a certain cut-off, that a certain sequence of discrete values can be expected, etc. By the same token, a ring component may have proved properties on one or more outputs of a referenced model. For example, the ring component may include information that a certain output will never show a certain sequence of values, stay within a range, etc.

That is, a ring component may contain information about classes of behavior of the referenced model. For example, if a referenced model contains a Gain block that takes as input the value of an Inport block, and produces as its output the value of an Outport block, then depending on the range of input values of the referenced model for that Inport block the range of output values of the referenced model for that Outport block is known. For example, if the Gain block has a factor 4 as parameter, then if the ring component specifies that the input is in the range [0 . . . 10] then the output will be in the range [0 . . . 40]. This could be numerically stored (e.g., [0 . . . 40]) or symbolically (e.g., [4*umin . . . 4*umax] where umin is the lower bound of [0 . . . 10] and umax the upper bound). Static analysis may compute the how input and output values relate, for example by abstract interpretation, by model checking, by symbolic analysis, etc. The results of these analyses may then be stored with the ring component.

Model Example

Figure 6:
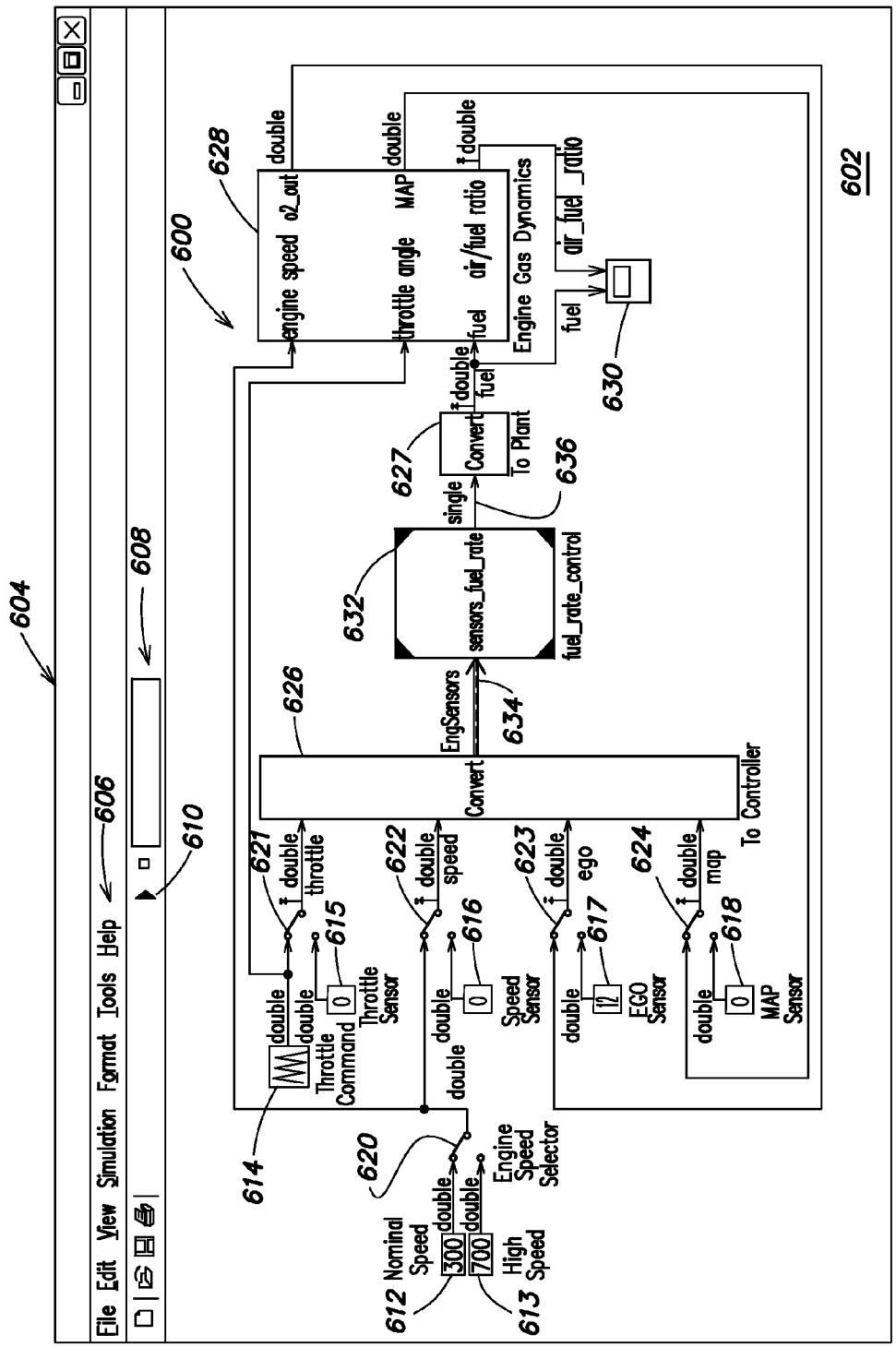
FIG. 6 is an illustration of an exemplary parent graphical model in accordance with an embodiment of the present invention.

FIG. 6 is a schematic illustration of a computer-generated graphical model 600 having executable semantics. The model 600 may be constructed on a model canvas 602 of a model editor 604. In addition to the canvas 602, the model editor 604 may include a menu bar 606, and a toolbar 608, among other graphical elements. The toolbar 608 may include a Run button 610, among other command buttons. In response to a user selecting the Run button 610, for example with the mouse 118, the simulation engine 206 may execute the model 600.

The model 600 may represent a fuel control system for a gasoline engine, and may include both time-based and state-based modeling elements. Sensors that simulate measurements of throttle angle, speed, exhaust gas oxygen (EGO), and manifold absolute pressure (MAP) may be selectively disabled to simulate failures.

The model 600 may include a plurality of graphical objects, such as blocks, interconnected by connection lines, such as arrows. Specifically, the model 600 may include six Inport blocks 612-618 (Nominal Speed, High Speed, Throttle Command, Throttle Sensor, Speed Sensor, EGO Sensor, and MAP Sensor), five switch blocks 620-624, three subsystem blocks 626-628 (To Controller, To Plant, and Engine Gas Dynamics). The model 600 may also include a Scope block 630. In addition, the model 600, which may be referred to as a parent model, may include a model reference block 632 (Fuel Rate Control) that represents another model, referred to as a referenced model or a sub-model. The model reference block 632 may be connected to the subsystem block 626 (To Controller) by a bus signal line 634 that carries a plurality of signals, namely the throttle, speed, EGO, and MAP signals of the parent model 600. In addition, the model reference block 632 may be connected to the subsystem block 627 (To Plant) by a signal line 636.

Figure 7:
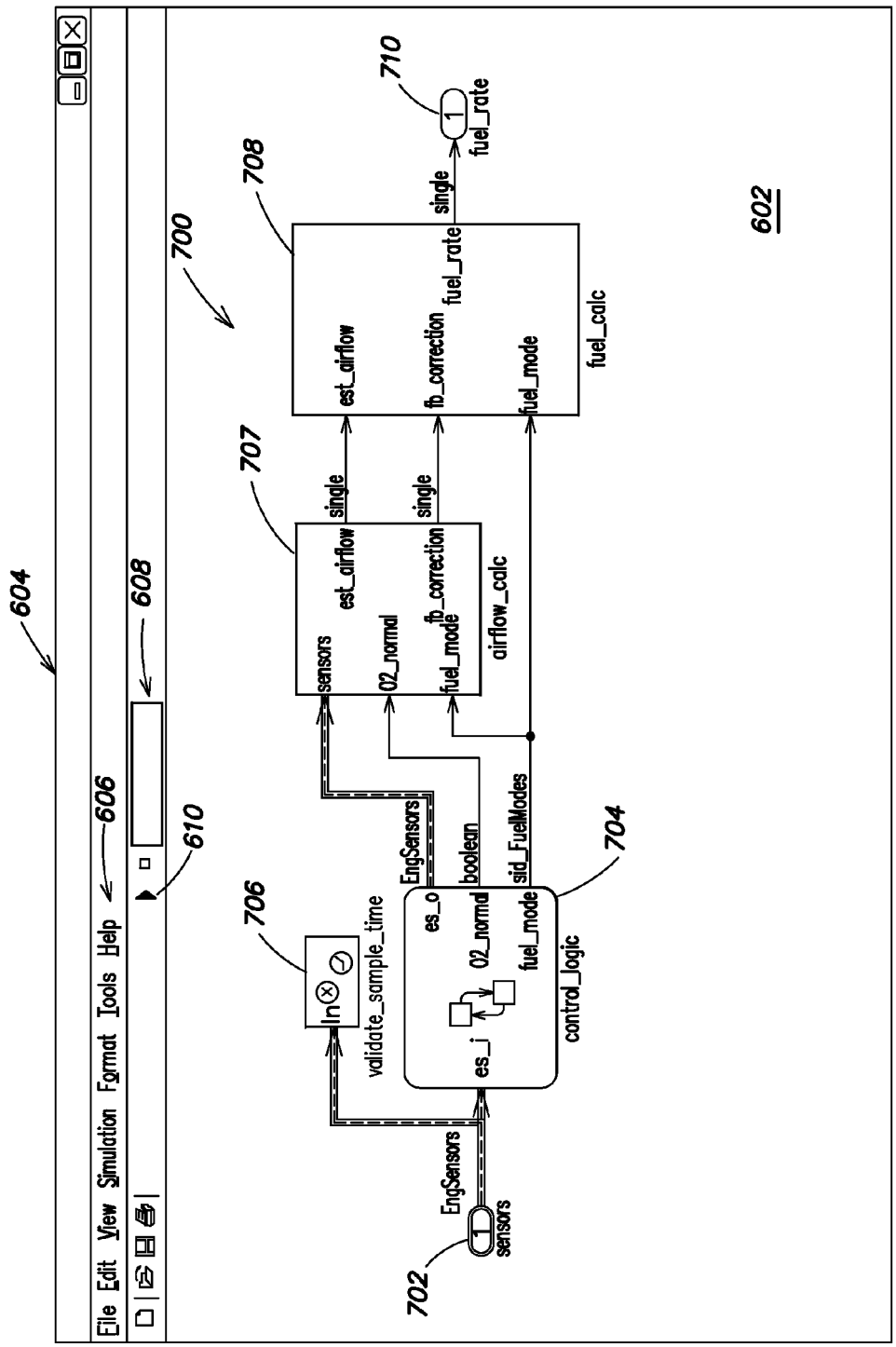
FIG. 7 is an illustration of an exemplary referenced graphical model in accordance with an embodiment of the present invention.

FIG. 7 is a schematic illustration of a computer-generated graphical model 700, representing the Fuel Rate Control sub-model as a referenced model included in the parent model 600. The referenced model 700 includes an Inport block 702 (sensors) that reads a plurality of signal from the parent model 600, a state chart 704 (control_logic), three subsystem blocks 706-708 (validate_sample_time, airflow_calc, and fuel_calc), and an Outport block 710 (fuel_rate) that writes a signal that is read by the parent model 600.

After adding the referenced model 700, as represented by the model reference block 632, to the parent model 600, the user may select a particular ring component for the referenced model 700. Suppose, for example, that the signals carried by the bus signal line 634 of the parent model 600, which are to be read by the model reference block 632, are single precision floating point data type. Suppose further that the signal line 636, which is to be written by the model reference block 632 and read by the subsystem block 627 is also single precision floating point data type. In this case, the user may open the Model Explorer for the parent model 600, and select a first interface object associated with the model reference block 632 that configures the Inport block 702 to write a plurality of signals, specifically throttle, speed, EGO, and MAP signals in single precision floating point data type. By utilizing such an interface object, the model reference block 632 will match the signals of the parent model 600, thereby avoiding errors.

Figure 8:
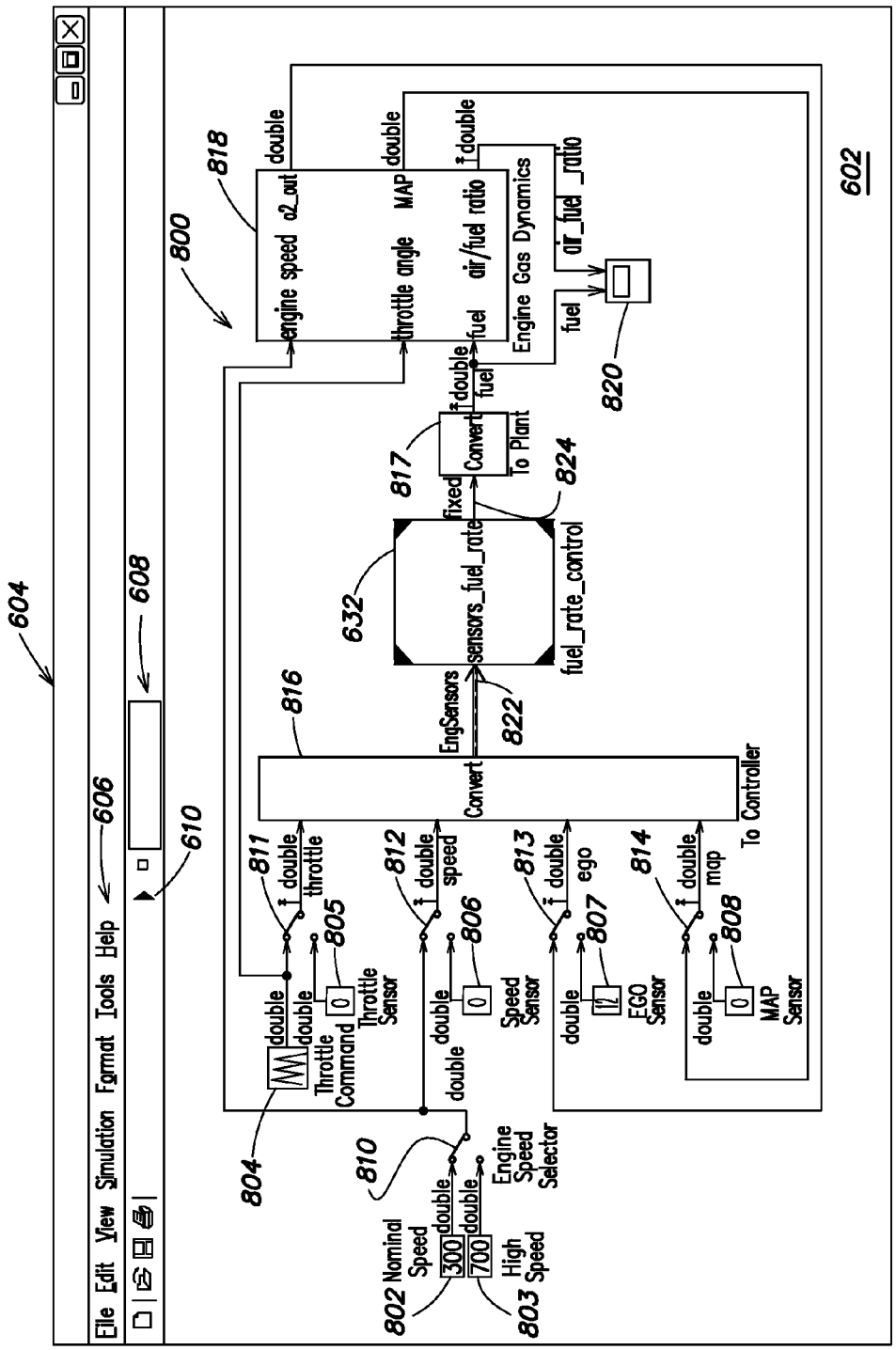
FIG. 8 is an illustration of an exemplary parent graphical model in accordance with another embodiment of the present invention.

Suppose, however, that a user wishes to use the model reference block 632 in a different parent model. FIG. 8 is a schematic illustration of a second parent model 800 in which the model reference block 632 may also be used. The second model 800 may include six Inport blocks 802-808 (Nominal Speed, High Speed, Throttle Command, Throttle Sensor, Speed Sensor, EGO Sensor, and MAP Sensor), five switch blocks 810-814, three subsystem blocks 816-818 (To Controller, To Plant, and Engine Gas Dynamics), and a Scope block 820. As noted, Inport blocks may be source blocks. The model reference block 632 may be connected to the subsystem block 816 (To Controller) by a bus signal line 822, and to the subsystem block 817 (To Plant) by a signal line 824.

While the second parent model 800 appears similar to the first parent model 600, the signals carried by the bus signal line 822, instead of being single-precision, floating point data types, are fixed point data types. In addition, the subsystem block 817 (To Plant) expects a fixed point signal, not a single-precision floating point signal, from the model reference block 632. In this case, the user may open the Model Explorer for the second parent model 600, and select a second interface object associated with the model reference block 632 that configures the Inport block 702 to write a plurality of signals, specifically throttle, speed, EGO, and MAP signals, in fixed point data type. Alternatively, the ring component selector 236 may display the available ring components, for example in a dialog window, in response to the selection of the model reference block, e.g., by right-clicking, the model reference block within the parent model.

Accordingly, the same referenced model (represented by the model reference block 632), may be used in the second parent model 800 without having to make any changes to the referenced model 700 itself. Instead, a different interface object may be selected depending on the parent model 600, 800 in which the referenced model 700 is added or inserted.

It should be understood that instead of selecting different interface objects for the referenced model 700 depending on which parent model 600, 800 it is included in, different configuration set objects, parameter groups, and/or harness models may be selected for the referenced model 700.

Figure 9:
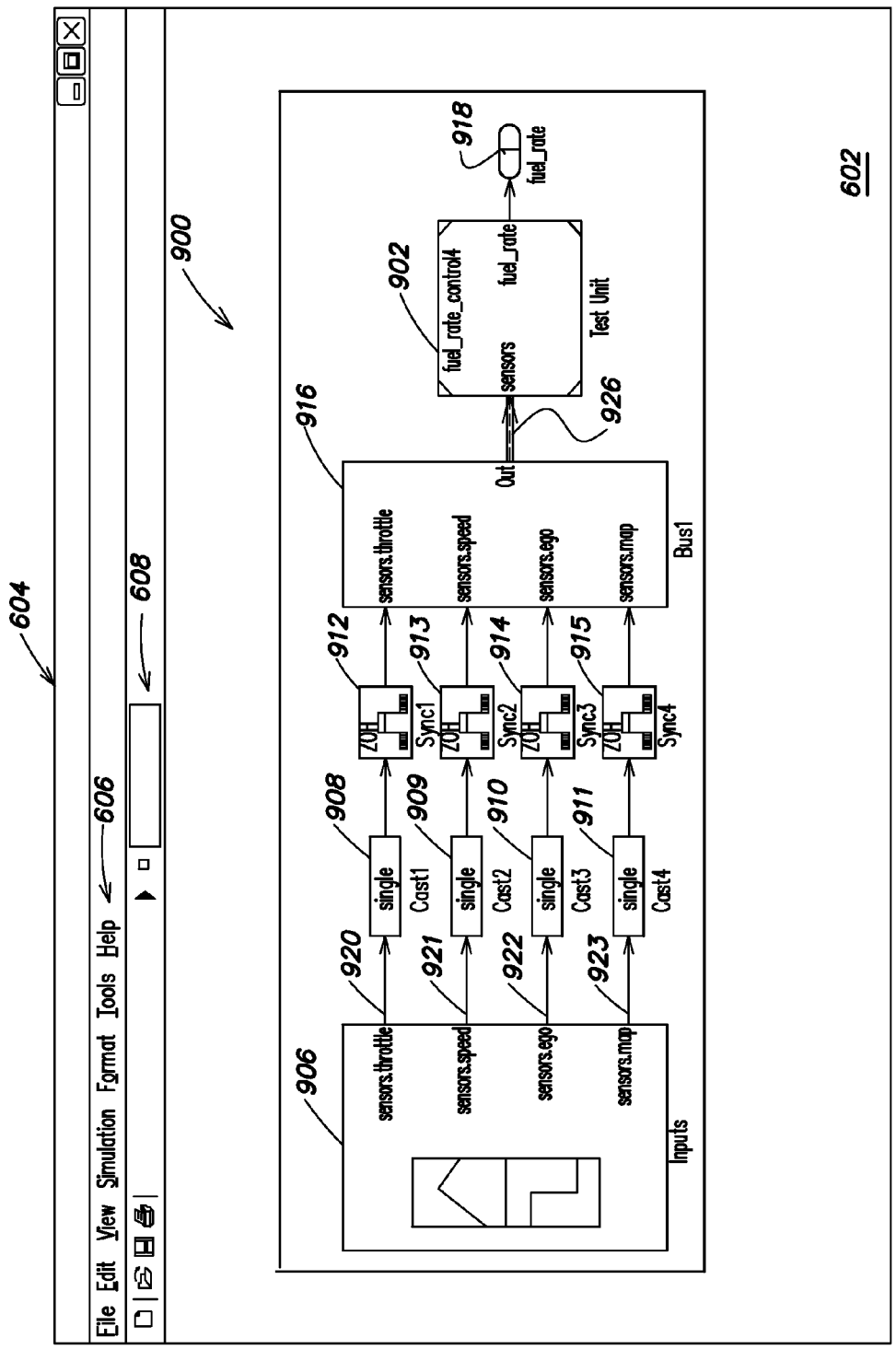
FIG. 9 is an illustration of an exemplary harness model in accordance with an embodiment of the present invention.

FIG. 9 is a schematic illustration of a harness model 900 in accordance with an embodiment of the invention. The harness model 900, which includes the referenced model 700 (FIG. 7) as represented by model reference block 902, may be a separate model constructed in the model editor 604. A user may construct the harness model 900 by selecting graphical objects, such as blocks, from a library, placing them on the canvas 602, and connecting at least some of the block with lines, such as arrows, that establish relationships among the blocks.

In an embodiment, the harness builder 244 may automatically construct a harness model, such as harness model 900. For example, the harness builder 244 may evaluate the referenced model, and identify the referenced model's external inputs and outputs. The harness builder 244 may automatically construct a harness model having one or more Signal Builder blocks, and may configure the one or more Signal Builder blocks to drive the external inputs identified in the referenced model. The harness model may also include a subsystem that transmits signals from the one or more Signal Builder blocks to the referenced model. The subsystem may verify that the signals have the desired attributes, for example, data type, size, etc.

The harness model 900 may include a plurality of blocks that may be interconnected by lines representing signals. In particular, the harness model 900 may include a Signal Builder block 906, four data type conversion blocks 908-911, four zero order hold blocks 912-915, a Bus Creator block 916, and an Outport block 918. The Signal Builder block 906, which is a type of source block, may be configured to source a plurality of signals, such as a throttle signal 920, a speed signal 921, an EGO signal 922, and a MAP signal 923. In addition, the attributes of the signals sourced by the Signal Builder block may be specified, for example, by setting parameters of the Signal Builder block 906. The data type conversion blocks 908-911 receive the signals 920-923, and may convert the data types of those signals based on the parameters of the respective data type conversion blocks 908-911. The zero order hold blocks 912-915 receive the signals 1 written by the data type conversion blocks 908-911, and hold their inputs for a sample time specified through one or more parameters of the respective blocks 912-915. The Bus Creator block 916 receives the signals written by the zero order hold blocks 912-915, and combines these signals into a bus. A bus signal 926 written by the Bus Creator block 916 is received at, e.g., read by, the model reference block 902 that represents the referenced model 700.

The data type conversion blocks 908-911 may be configured to convert the signals from the Signal Builder block 906 to signals having a single precision data type. The zero order hold blocks 912-915 and the Bus Creator block 916, moreover, may be configured to inherit the data type from the data type conversion blocks 908-911. As a result, the signals making up the bus signal 926, which is read by the model reference block 902, have a single precision data type. Because of the design and configuration of the harness model 900, the model reference block 902 is influenced to receive signals having a single precision data type. Accordingly, by associating the referenced model 700 with the harness model 900, the referenced model 700 is made compatible with parent model 600, in which the To Controller subsystem block 626 writes a bus signal having four signals (throttle, speed, EGO, and MAP) having single precision data types.

Figure 10:
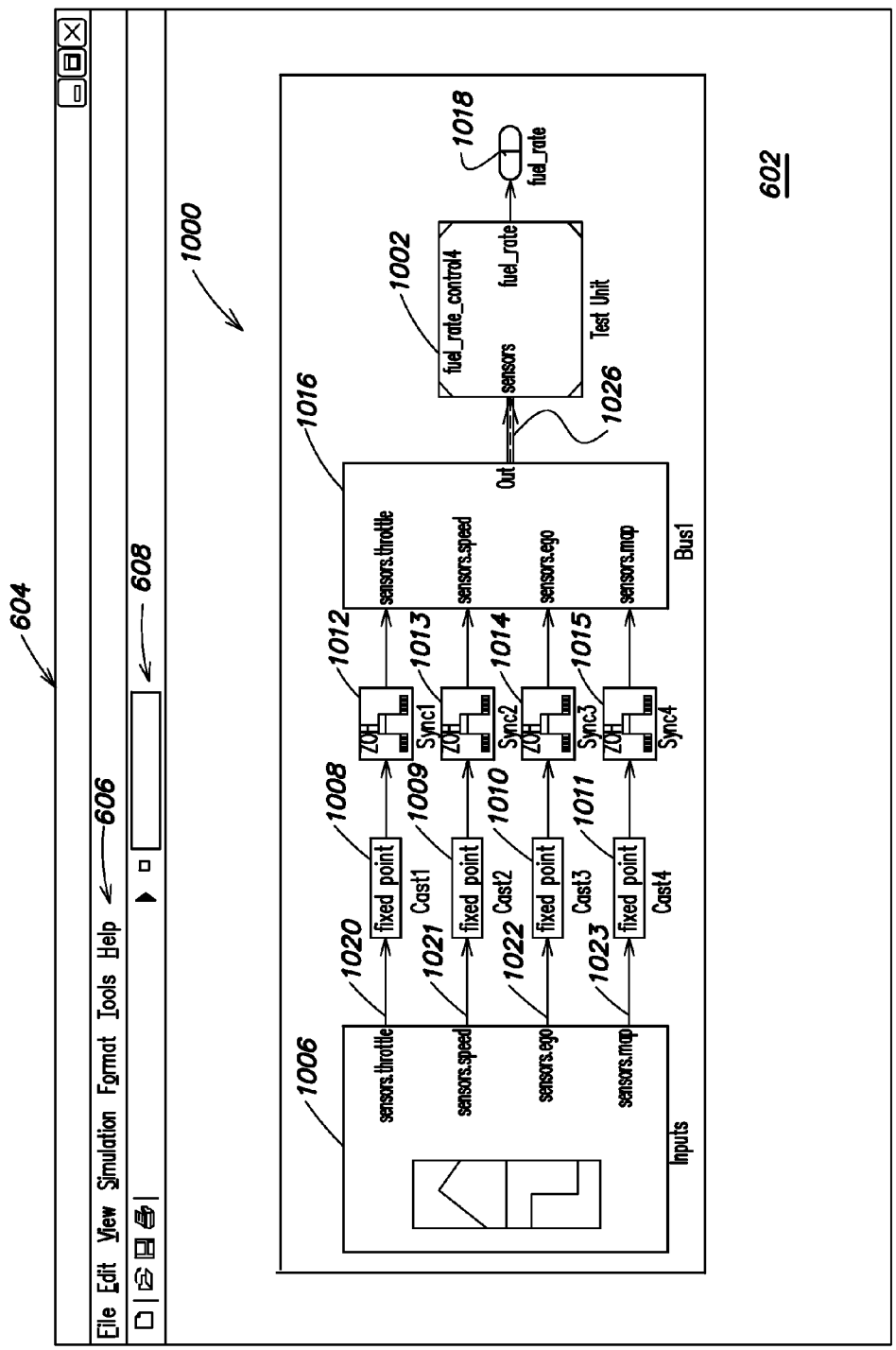
FIG. 10 is an illustration of an exemplary harness model in accordance with another embodiment of the present invention.

Other harness models may also be constructed and saved for the referenced model 700. FIG. 10 is a schematic illustration of a second harness model 1000 that also may be used with the referenced model 700. Like the harness model 900, the harness model 1000 includes a model reference block 1002 that represents the referenced model 700. The harness model 1000 also includes a Signal Builder block 1006, four data type conversion blocks 1008-1011, four zero order hold blocks 1012-1015, a Bus Creator block 1016, and an Outport block 1018. The Signal Builder block 1006 sources a throttle signal 1020, a speed signal 1021, an EGO signal 1022, and a MAP signal 1023. The data type conversion blocks 1008-1011 may be configured to convert the signals from the Signal Builder block 1006 to signals having a fixed point data type. The zero order hold blocks 1012-1015 and the Bus Creator block 1016, moreover, may be configured to inherit the data type from the data type conversion blocks 1008-1011. As a result, the signals making up the bus signal 1026, which is read by the model reference block 1002, have a fixed point data type. The harness model 1000 thus influences the model reference block 1002 to receive signals having a fixed precision data type. Accordingly, by associating the referenced model 700 with the harness model 1000, the referenced model 700 is made compatible with parent model 800, in which the To Controller subsystem block 816 writes a bus signal having four signals (throttle, speed, EGO, and MAP) having fixed point data types.

It should be understood that harness models 900, 1000 are intended for illustrative purposes, and that other harness models may be constructed that influence the referenced model to have other execution behaviors or code generator characteristics. In order to influence the referenced model to have the desired execution behavior or code generation characteristics, the simulation engine 206 may execute the harness model, and utilize the referenced model, as executed in the harness model, for execution or code generation within the parent model.

In an embodiment, a harness model, such as model 900 and/or 1000, may be used to perform model coverage analysis on the parent model and/or the referenced model. Model coverage refers to a validation process that measures how thoroughly the model's objects are tested. For example, model coverage may generate results that indicate how much a test case exercises, for example, simulation pathways through a model, functionality that is associated with parts of the model, decision logic that is associated with parts of the model (decision coverage), conditions that are associated with parts of the model (condition coverage), and combinations (e.g., condition/decision coverage). Model coverage is described in U.S. Pat. No. 7,970,594 for a System and Method for Using Model Analysis to Generate Directed Test Vectors, which is hereby incorporated by reference in its entirety. Suitable model coverage analysis tools include the Simulink Verification and Validation™ tool from The MathWorks, Inc., which is described in the Simulink Verification and Validation User's Guide (September 2011 edition), which is hereby incorporated by reference in its entirety.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A non-transitory computer-readable medium comprising program instructions, the program instructions when executed by a processing element operable to:
   receive a selection, from a plurality of available ring components, of a first ring component for a first instance of a referenced model included within a parent model and a second ring component for a second instance of the referenced model included within the parent model, the first and second ring components specifying information including:
      one or more block-level parameters of the referenced model, or
      one or more signal-level attributes of the referenced model;
   execute the parent model that includes the first and second instances of the referenced model;
   utilize the information included in the first ring component during execution of the first instance of the referenced model within a first context of the parent model;
   utilize the information included in the second ring component during execution of the second instance of the referenced model within a second context of the parent model; and
   present a result of the execution of the parent model on an output device, where the information included in the first ring component imposes a first execution behavior on the first instance of the referenced model, and the information included in the second ring component imposes a second execution behavior on the second instance of the referenced model.

2. The non-transitory computer-readable medium of claim 1 further comprising program instructions to:
   determine whether the first instance of the referenced model has been previously compiled and loaded into a storage medium,
   if the first instance of the referenced model has been previously compiled and loaded into the storage medium:
      execute the first instance of the referenced model as previously compiled and loaded into the storage medium;
   if the first instance of the referenced model not been previously compiled and loaded into the storage medium:
      compile the first instance of the referenced model to create a compiled version,
      load the compiled version into the storage medium, and execute the compiled version.

3. The non-transitory computer-readable medium of claim 1 wherein the information specified by the first and second ring components further includes one or more model-level settings, and the one or more model-level settings include a solver type, one or more optimization options, one or more data import selections, one or more data output selections, one or more diagnostic options, and one or more code generation options.

4. The non-transitory computer-readable medium of claim 1 wherein the one or more signal-level attributes include a data type, a numeric type, and a dimensionality.

5. A method comprising:
   storing, in a storage medium,
      a parent model,
      a referenced model, where first and second instances of the referenced model are included in the parent model, the referenced model including blocks and connections among the blocks, the referenced model having model parameters, the blocks having block parameters, and the connections having connection parameters, and
      a plurality of ring components for the referenced model, the plurality of ring components including at least one of
         one or more block-level attributes specifying values for one or more of the block parameters of the referenced model, or
         one or more connection-level attributes specifying values for one or more of the connection parameters of the referenced model;
   receiving, by a processor coupled to the storage medium, one or more indications of
      a first ring component for use with the first instance of the referenced model included in the parent model, and
      a second ring component for use with the second instance of the referenced model included in the parent model; and
   during at least one of executing the parent model, performing static analysis on the parent model, or generating code for the parent model, by the processor, applying, by the processor, the at least one of
      the one or more block-level attributes from the first ring component to the one or more of the block parameters of the first instance of the referenced model in the parent model, or
      the one or more connection-level attributes from the first ring component to the one or more of the connection parameters of the first instance of the referenced model in the parent model, and applying, by the processor, the at least one of
      the one or more block-level attributes from the second ring component to the one or more of the block parameters of the second instance of the referenced model in the parent model, or
      the one or more connection-level attributes from the second ring component to the one or more of the connection parameters of the second instance of the referenced model in the parent model.

6. The method of claim 5 wherein the first instance of the referenced model is included in the parent model at a first call site and the first ring component is used when calling the first instance of the referenced model, and the second instance of the referenced model is included in the parent model at a second call site, and the second ring component is used when calling the second instance of the referenced model.

7. The method of claim 5 where the plurality of ring components specifies different execution, static analysis, or code generation behaviors of the referenced model.

8. The method of claim 5 wherein the plurality of ring components for the referenced model further include one or more model-level attributes specifying values for the model parameters of the referenced model, the method further comprising:
   applying, by the processor, the one or more model-level attributes from the first ring component to the model parameters of the first instance of the referenced model in the parent model; and
   applying, by the processor, the one or more model-level attributes from the second ring component to the model parameters of the second instance of the referenced model in the parent model.

9. The method of claim 5 wherein the first instance of the referenced model is executed atomically relative to the parent model.

10. The method of claim 5 wherein
    a portion of the parent model is connected to the first instance of the referenced model,
    the portion of the parent model is associated with at least one of a data dimension and a data type, and
    the first ring component has the same data dimension or the same data type as the portion of the parent model.

11. The method of claim 5 wherein the first and second ring components are implemented from elements selected from the group consisting of:
    an interface object,
    a configuration set object,
    a parameter group, and
    a harness.

12. The method of claim 11 further comprising:
    executing the harness to obtain model coverage analysis results for at least one of the parent model or the first instance of the referenced model.

13. The method of claim 5 wherein the referenced model and the parent model are executable graphical models having at least one of:
    time-based execution semantics,
    event-based execution semantics,
    state-based execution semantics,
    frequency-based execution semantics,
    control-flow based execution semantics, or
    dataflow-based execution semantics.

14. The method of claim 5 wherein the first ring component is user selected or programmatically selected.

15. The method of claim 5 wherein the one or more block-level attributes of the first ring component are used to configure one or more block behaviors of the first instance of the referenced model.

16. The method of claim 15 wherein the one or more block behaviors include at least one of:
   a data dimension,
   a data type,
   a value, or
   a sampling mode.

17. The method of claim 5 wherein the first ring component is stored with the referenced model.

18. The method of claim 5 wherein the first ring component is stored with the parent model.

19. The method of claim 5 wherein the first ring component is stored separately from both the referenced model and the parent model.

20. The method of claim 5 wherein the first ring component is specified through a graphical representation, or a textual representation, or a combination graphical/textual representation.

21. The method of claim 5 wherein the parent model is a first parent model, the method further comprising:
   adding the referenced model to a second parent model;
   utilizing a third model ring component with the referenced model included in the second parent model, where the third model ring component differs from the first and second model ring components.

22. An apparatus comprising:
   a storage medium storing
      a parent model,
      a referenced model, where first and second instances of the referenced model are included in the parent model, the referenced model including blocks and connections among the blocks, the referenced model having model parameters, the blocks having block parameters, and the connections having connection parameters, and
      a plurality of ring components for the referenced model, the plurality of ring components including at least one of
         one or more block-level attributes specifying values for one or more of the block parameters of the referenced model, or
         one or more connection-level attributes specifying values for one or more of the connection parameters of the referenced model; and
   a processor coupled to the storage medium, the processor configured to
      receive one or more indications of
         a first ring component for use with the first instance of the referenced model included in the parent model, and
         a second ring component for use with the second instance of the referenced model included in the parent model; and
      during at least one of executing the parent model, performing static analysis on the parent model, or generating code for the parent model,
         apply the at least one of
            the one or more block-level attributes from the first ring component to the one or more of the block parameters of the first instance of the referenced model in the parent model, or
            the one or more connection-level attributes from the first ring component to the one or more of the connection parameters of the first instance of the referenced model in the parent model, and apply the at least one of
            the one or more block-level attributes from the second ring component to the one or more of the block parameters of the second instance of the referenced model in the parent model, or
            the one or more connection-level attributes from the second ring component to the one or more of the connection parameters of the second instance of the referenced model in the parent model.

23. The apparatus of claim 22 wherein the processor is configured to instantiate an interface object as the first ring component.

24. The apparatus of claim 22 wherein the processor is further configured to create a parameter group as the first ring component.

25. The apparatus of claim 22 wherein
   the referenced model and the parent model are executable graphical models, and
   the processor is further configured to construct a graphical harness for the first ring component.

26. The apparatus of claim 25 wherein the storage medium further stores a model file associated with the referenced model, and the graphical harness is stored in the model file associated with the referenced model.

27. The apparatus of claim 22 wherein the processor is further configured to perform incremental code generation for the first instance of the referenced model and the first ring component.

28. The apparatus of claim 22 where the plurality of ring components specifies different execution, static analysis, or code generation behaviors of the referenced model.

29. The apparatus of claim 22 wherein the plurality of ring components for the referenced model further include one or more model-level attributes specifying values for the model parameters of the referenced model, the processor further configured to:
   apply the one or more model-level attributes from the first ring component to the model parameters of the first instance of the referenced model in the parent model; and
   apply the one or more model-level attributes from the second ring component to the model parameters of the second instance of the referenced model in the parent model.

30. A non-transitory computer-readable medium comprising program instructions, the program instructions when executed by a processor operable to:
   store, in a storage medium coupled to the processor,
      a parent model,
      a referenced model, where first and second instances of the referenced model are included in the parent model, the referenced model including blocks and connections among the blocks, the referenced model having model parameters, the blocks having block parameters, and the connections having connection parameters, and
      a plurality of ring components for the referenced model, the plurality of ring components including at least one of
         one or more block-level attributes specifying values for one or more of the block parameters of the referenced model, or one or more connection-level attributes specifying values for one or more of the connection parameters of the referenced model;

receive, by the processor, one or more indications of
- a first ring component for use with the first instance of the referenced model included in the parent model, and
- a second ring component for use with the second instance of the referenced model included in the parent model; and during at least one of executing the parent model, performing static analysis on the parent model, or generating code for the parent model,
- apply, by the processor, the at least one of
  - the one or more block-level attributes from the first ring component to the one or more of the block parameters of the first instance of the referenced model in the parent model, or
  - the one or more connection-level attributes from the first ring component to the one or more of the connection parameters of the first instance of the referenced model in the parent model, and applying, by the processor, the at least one of
- the one or more block-level attributes from the second ring component to the one or more of the block parameters of the second instance of the referenced model in the parent model, or
- the one or more connection-level attributes from the second ring component to the one or more of the connection parameters of the second instance of the referenced model in the parent model.

31. The non-transitory computer-readable medium of claim 30 where the plurality of ring components specifies different execution, static analysis, or code generation behaviors of the referenced model.

32. The non-transitory computer-readable medium of claim 30 wherein the plurality of ring components for the referenced model further include one or more model-level attributes specifying values for the model parameters of the referenced model, the program instructions further comprising program instructions to:
- apply the one or more model-level attributes from the first ring component to the model parameters of the first instance of the referenced model in the parent model; and
- apply the one or more model-level attributes from the second ring component to the model parameters of the second instance of the referenced model in the parent model.

\* \* \* \* \*

UNITED STATES PATENT AND TRADEMARK OFFICE
CERTIFICATE OF CORRECTION

PATENT NO.           : 10,365,897 B1
APPLICATION NO.      : 13/478344
DATED                : July 30, 2019
INVENTOR(S)          : Mojdeh Shakeri et al.

Page 1 of 1

It is certified that error appears in the above-identified patent and that said Letters Patent is hereby corrected as shown below:

In the Specification

Column 12, Lines 15-16 read:
"code for the referenced model within the context of generating code for the parent model, has indicated at block 358."
Should read:
--code for the referenced model within the context of generating code for the parent model, as indicated at block 358.--

Column 16, Line 64 reads:
"one, more, or all of the following components: a Solver 1"
Should read:
--one, more, or all of the following components: a Solver--

Column 22, Line 45 reads:
"receive the signals 1 written by the data type conversion"
Should read:
--receive the signals written by the data type conversion--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*